United States Patent [19]
Moncsko

[11] Patent Number: 5,742,533
[45] Date of Patent: Apr. 21, 1998

[54] METHOD AND APPARATUS FOR MODULUS ERROR CHECKING

[75] Inventor: Robert Carl Moncsko, Cary, N.C.

[73] Assignee: International Business Machines Corporation, Armonk, N.Y.

[21] Appl. No.: 655,326

[22] Filed: May 21, 1996

[51] Int. Cl.$^6$ ...................................................... G06F 11/00
[52] U.S. Cl. ...................................................... 364/737
[58] Field of Search ................................... 364/737, 745, 364/748

[56] References Cited

U.S. PATENT DOCUMENTS

| | | |
|---|---|---|
| 3,436,647 | 4/1969 | Gobeli et al. . |
| 3,887,820 | 6/1975 | Glennon . |
| 4,338,658 | 7/1982 | Toy . |
| 4,845,659 | 7/1989 | Hrusecky . |
| 4,849,923 | 7/1989 | Samudrala et al. . |
| 4,852,039 | 7/1989 | Maheshwari et al. . |
| 4,858,165 | 8/1989 | Gronowski et al. . |
| 4,874,961 | 10/1989 | Henderson . |
| 5,289,396 | 2/1994 | Taniguchi ................. 364/737 |
| 5,317,527 | 5/1994 | Britton et al. . |
| 5,321,644 | 6/1994 | Schibinger ................ 364/737 |
| 5,325,520 | 6/1994 | Nguyen et al. . |
| 5,373,461 | 12/1994 | Bearden et al. . |
| 5,384,723 | 1/1995 | Karim et al. . |
| 5,408,651 | 4/1995 | Flocken et al. . |
| 5,504,697 | 4/1996 | Ishida ...................... 364/737 |

FOREIGN PATENT DOCUMENTS

| | | |
|---|---|---|
| 0188638 | 1/1985 | European Pat. Off. . |
| 173768B | 2/1988 | Germany . |
| 61-81180 | 4/1986 | Japan . |
| 2184226 | 7/1990 | Japan . |
| 838897B | 6/1981 | U.S.S.R. . |
| 9502919 | 1/1995 | WIPO . |

OTHER PUBLICATIONS

IBM TDB vol. 32, No. 3a, Aug. 1989, pp. 330–333, Title–Very High–Speed Algorithm for Drawing Conics by Schwartz.

IBM TDB vol. 35, No. 4A, Sep. 1992, pp. 135–136, Title–Early Exception Detection on Store With Convert by Beacom, Handlogten, Levenstein and Patel.

VDHL: Hardware Description and Design by Lipsett, Schaefer, Ussery–Intermetrics Inc. Published by Kluwer Academic Publishers 1989 Index, Chpt. 2,Chpt,5,Chpt.6.

IBM TDB vol. 32, No. 3A, Aug. 1989, pp. 330–333, Title–Enhanced High–Speed Algorithm For Drawing Curves by Schwartz.

IBM TDB vol. 7, No. 11, Apr. 1965, pp. 1042–1045, Title–Modulo–10 and Modulo 11 Self–Check Logic by Greene and Lettieri.

IBM TDB vol. 28, No. 7, Dec. 1985, pp. 2928–2934, Title–System Architecture for Efficient Pipeline Execution . . . by Kriz.

IBM TDB vol. 30, No. 10, Mar. 1988, pp. 303–305, Title–Variable Random Double Bit Error–Injecting Test Module by Garcia, Turner, Wong.

IBM TDB vol. 31, No. 7, Dec. 1988, pp. 149–153, Title–Software Verification of Microcode Transfer Using . . . by Prill, Mandalia.

IBM TDB vol. 31, No. 12, May 1989, pp. 252–257, Title Self–Aligning Robot Gripper by Barenboim.

*Primary Examiner*—Tan V. Mai
*Attorney, Agent, or Firm*—Shelley M. Beckstrand; Richard M. Goldman

[57] ABSTRACT

Apparatus and method for checking the final result of a computer implemented floating point arithmetic unit employs an effective subtract signal, which is already in use and logically required to generate the final result, to select either the requested floating point mathematical combination of modulus 3 operand residue or the compliment of requested mathematical combination of modulus 3 residue of the operands for comparison to the residue of the final result to detect an error in the final result without maintaining the sign value of the individual operand residues or the sign of the resultant residue.

11 Claims, 4 Drawing Sheets

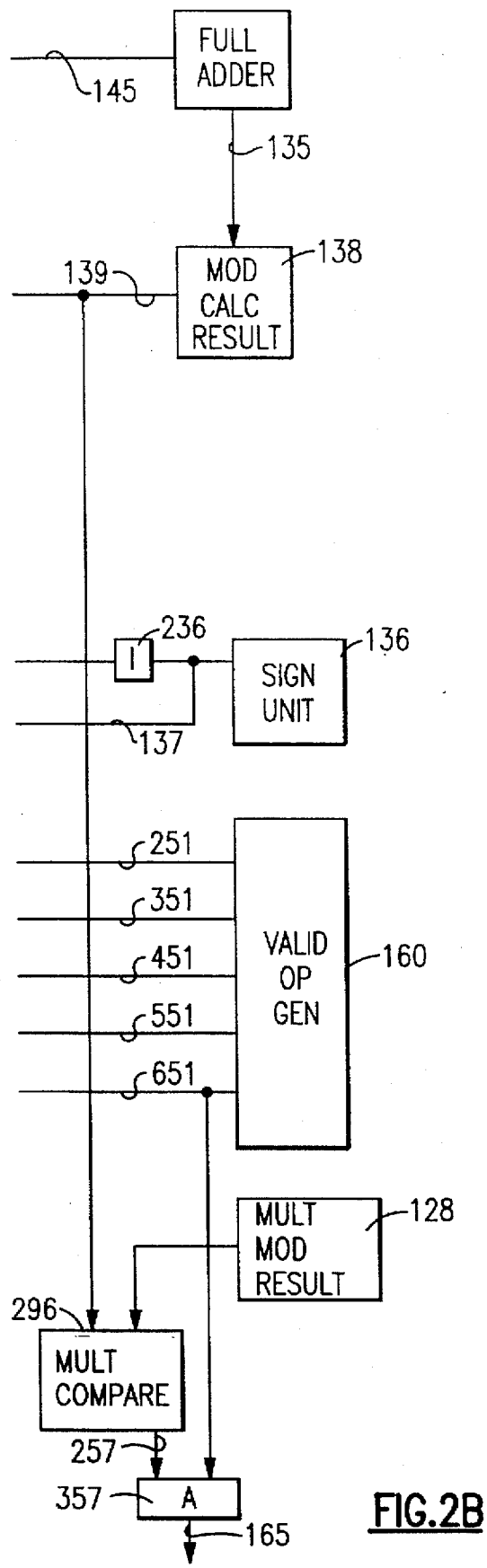
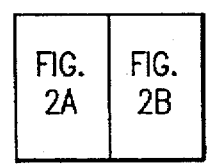
FIG. 2B
FIG. 2

METHOD AND APPARATUS FOR MODULUS ERROR CHECKING

BACKGROUND OF THE INVENTION

1. Technical Field of the Invention

This invention relates to a method and apparatus for checking the operation of electronic circuits performing floating point arithmetic operations. More particularly, the invention relates to the use of the effective subtract signal to compare the modulus 3 residue of the final result to the correct mathmatical combination of operand residue addition, subtraction, multiply-addition and multiply-subtraction calculation.

2. Background Art

The residue algorithm states that the residue of a final sum is equivalent to the sum of the residues of each operand. A similar postulation exists for multiplication and subtraction. See F. Sellers, Jr., Mn-Yue Hgiao, and L. Bearnson, *Error Detecting Logic for Digital Computers*, TK7888.354, QA76.5543, at pages 76 ff.

Using the residue algorithm to check the operation of an arithmetic logic unit as it performs such floating point operations generally requires providing circuitry or steps for carrying the residue of all operands, calculated floating point result and the residue sign through all calculations. This directing increases the number of circuits required to implement residue checking and reduces the performance of the checking function.

There is, therefore, a need in the art for an apparatus and method to perform mod3 residue checking which eliminates the need to maintain the sign value of individual operand residues as well as the sign of the resultant residue.

SUMMARY OF THE INVENTION

A computer implemented method and apparatus is provided for checking the operation of an arithmetic logic unit by checking the final result of floating point arithmetic operations by calculating an effective subtract signal, and based thereon selecting the correct mathematical combination of residue addition, subtraction, multiply-addition and multiply-subtraction to be used in checking the residue of the final floating point result.

Other features and advantages of this invention will become apparent from the following detailed description of the presently preferred embodiment of the invention, taken in conjunction with the accompany drawings.

BEST MODE FOR CARRYING OUT THE INVENTION

This invention eliminates the need to maintain the sign value of the individual operand residues as well as the sign of the resultant residue by employing the use of an effective subtract signal which is already in use and logically required to generate the final arithmetic answer.

With this technique, the effective subtract signal is used in selecting the correct mathematical combination of residue addition, subtraction, multiply-addition and multiply-subtraction in checking the residue of the final floating point result. In the event that the selected residues do not compare, an error signal is generated indicating that one or more circuits within the arithmetic logic unit have failed. In response to that error signal, corrective action may be taken, such as issuing an interrupt to cause execution of a correction routine outside of the scope of this invention.

Figure 1A:
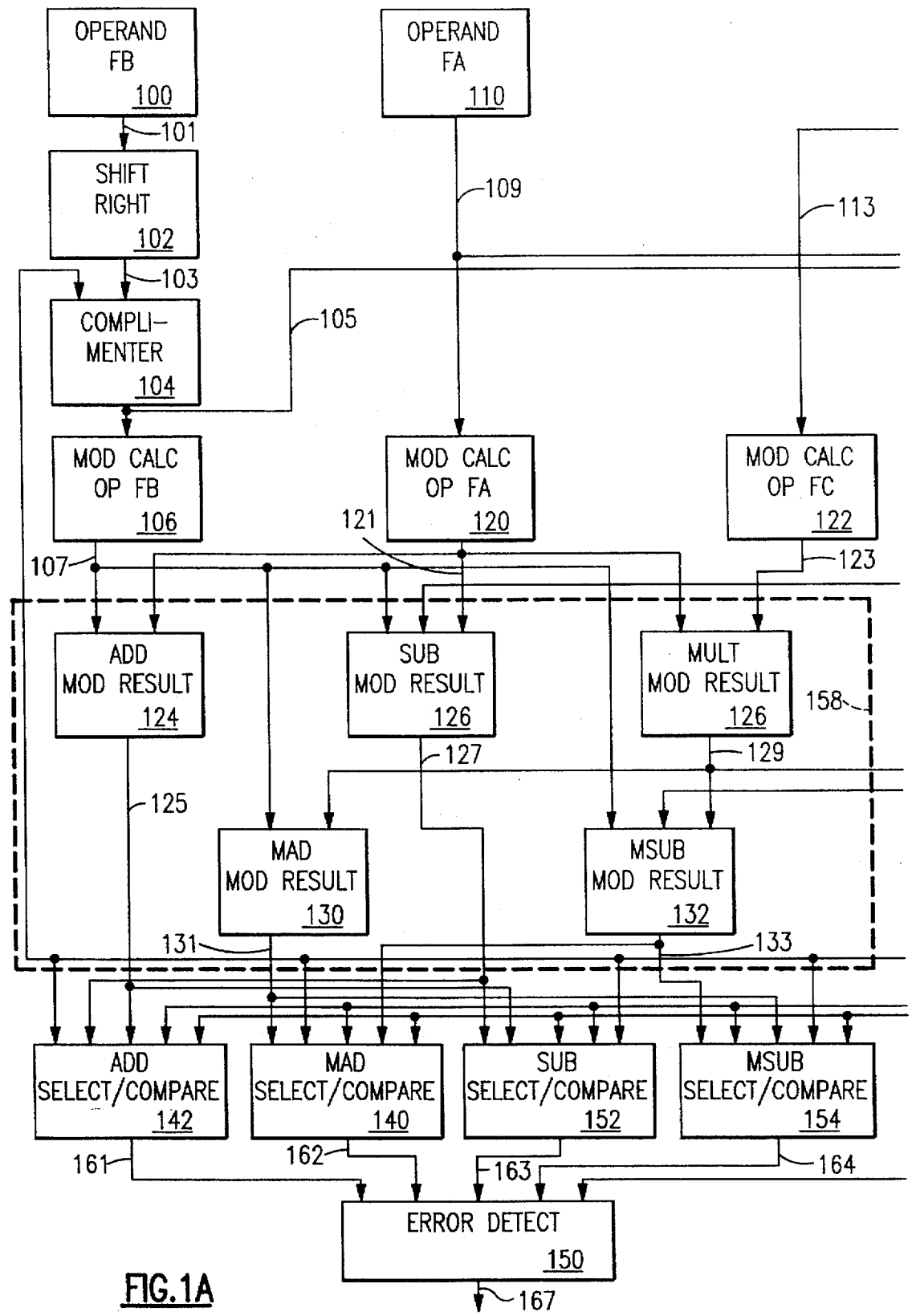
FIG. 1 is a block diagram representation of the apparatus of the invention.
Figures 1, 1B:
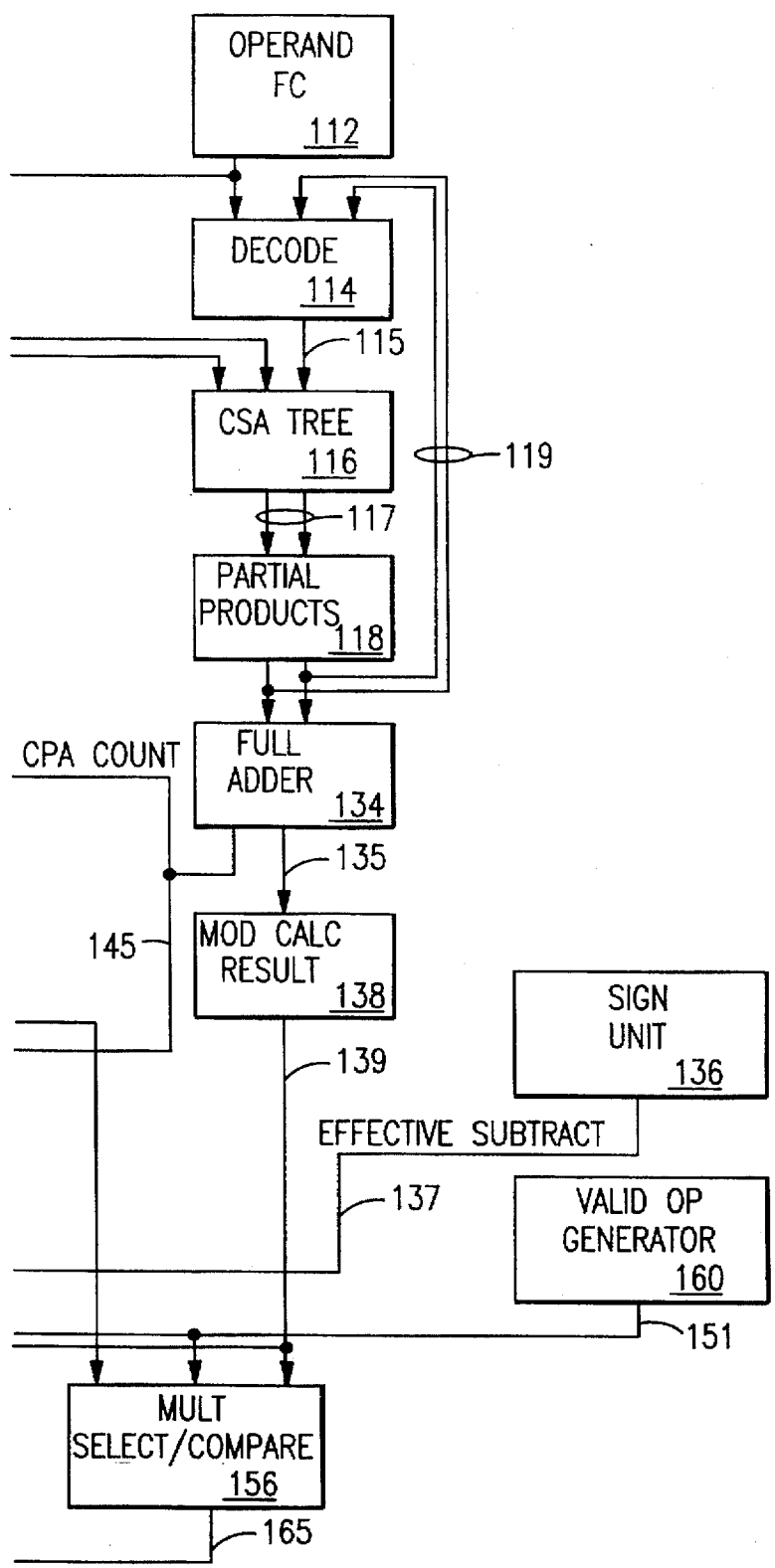

Referring to FIG. 1, by way of general overview and introduction, the result of an addition of two operands FA 110 and FB 100 is checked by the addition of the operand residues, the result of which is compared to the residue of the calculated sum, if this operation turns out to be an effective add, such as 1+2. If the addition, in reality, is an effective subtract, such as 1+(−2), then the result is checked by the compliment mathmatical calculation of subtraction. In practice for modulus 3 calculations, the residue compliment of an addition is the same as the residue calculated for a straight residue subtraction, and vice versa. This means that an addition operation that results in an effective subtract can be checked by the subtract residue checker. Likewise, a subtract operation that results in an effective add can be checked by the addition residue checker.

The effective subtract signal is externally calculated from comparisons of input operand sign values and the floating point mathematical function to be performed. Effective subtract is considered active for addition if operands are of different sign, for subtraction if operands are of same sign, for multiply-add (MAD) if the resultant product sign is different from the add operand sign, and for multiply-subtract (MSUB) if the resultant product sign is equal to the subtract operand sign.

More complexity results from multiple floating point instructions such as multiply-add and multiply-subtract, where it is not clear if the magnitude of the results of multipling two operands FA 110 and FC 112 will cause an effective add or effective subtract with third operand FB 100. Use of the carry out signal 145 from final adder block 134, correctly handles these situations and increases the number of floating point instructions that can be checked for better checking coverage, better performance and with fewer logic circuits.

Referring further to FIG. 1, a block diagram illustrating the apparatus of the invention is set forth. The residue check apparatus of the invention receives as inputs floating point operand FA 110, floating point operand FB 100 and floating point operand FC 112, where the relationship between operands FA, FB and FC, and the operations to be performed thereon, may take the following forms, or cases:

| | | |
|---|---|---|
| Case 1 (MULT) | FA * FC | |
| Case 2 (ADD) | FA + FB | |
| Case 3 (SUB) | FA − FB | where FA >= FB |
| Case 4 (SUB) | FA − FB | where FA < FB |
| Case 5 (MAD) | (FA * FC) + FB | where FB > 0 (zero) |
| Case 6 (MSUB) | (FA * FC) − FB | where (FA * FC) >= FB and FB > 0 (zero) |
| Case 7 (MSUB) | (FA * FC) − FB | where (FA * FC) < FB and FB > 0 (zero) |

Tables 1 through 12 are VHDL code listings for logic blocks in FIG. 1 representing the preferred embodiment of the invention, specifically a floating point unit modulus 3 result checker logic. VHDL is the VHSIC (very high speed integrated circuit logic) hardware description language of the IEEE standard 1076, and is described also in Libsett, Schaefer and Ussery, VHDL: *Hardware Description and Design*, Kluwe Academic Publishers, copyright 1989, Library of Congress TK7887.5.L57 1989 621.39'2 89-11114 ISBN 0-7923-9030-X.

Table 1 provides various initialization declarations, including ports and shift register latches (SRLs) for the memory elements. Table 2 provides clock synchronization to input interface signals. Tables 3 through 12 will be referred to hereinafter in connection with the description of FIG. 1.

Figure 2A:
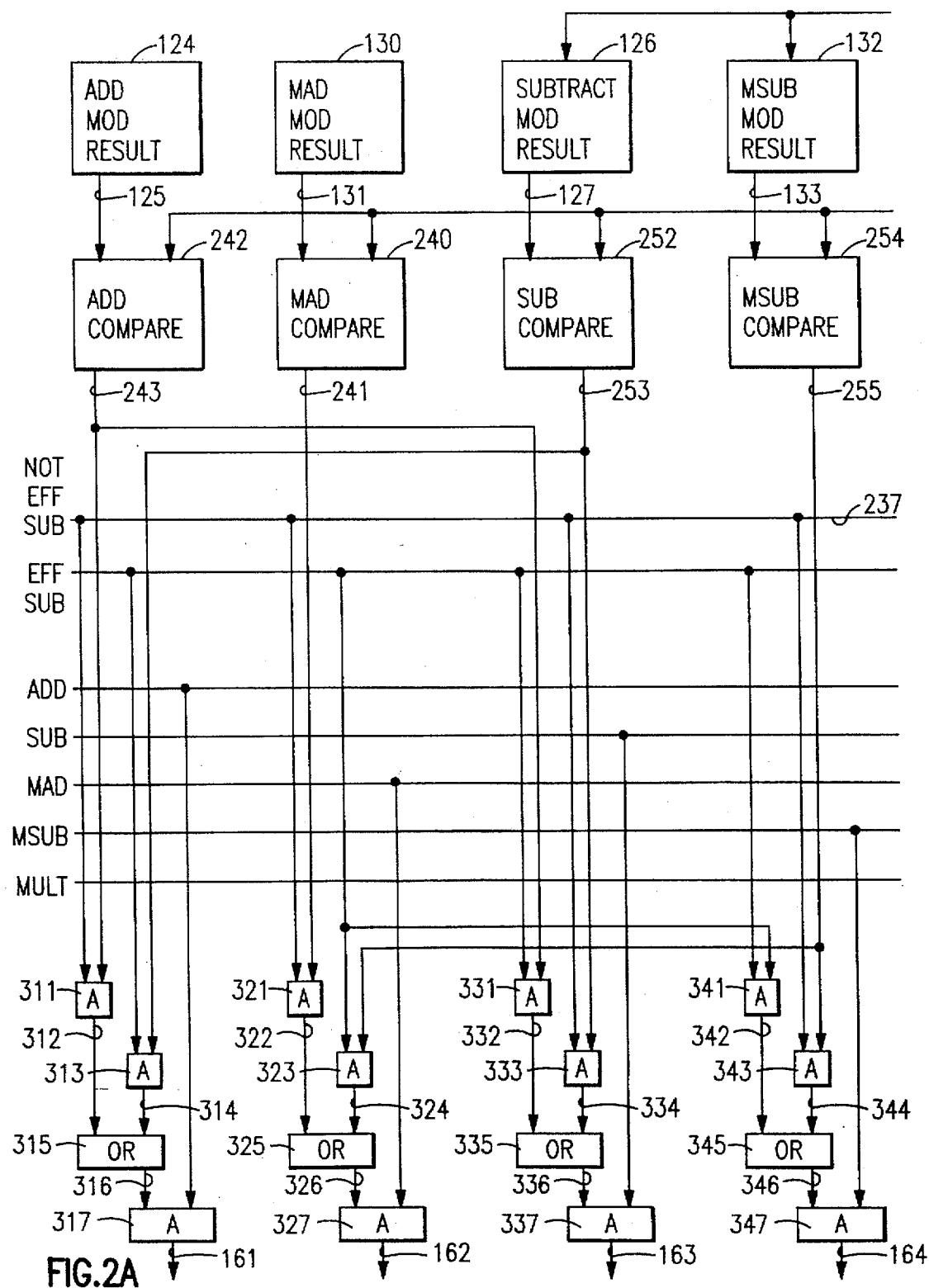
FIG. 2 is a schematic logic diagram representation in greater detail of the select compare blocks of FIG. 1.

Tables A and B cross reference the signal lines in FIGS. 1 and 2, respectively, with the signal names in Tables 1 through 12.

TABLE A

FIG. 1 Signal Name Correspondence

| Figure Line | Implementation Signal |
|---|---|
| 101 | Not in residue checker (Tables 1–12) |
| 103 | Not in residue checker |
| 105 | fpfbsht1_out(1 to 80) and fpfbsht2_out(81 to 160) |
| 107 | bm1h, bm2h |
| 109 | fpfafraw(0 to 52) |
| 113 | fpfcfraw(0 to 52) |
| 115 | Not in residue checker |
| 117 | Not in residue checker |
| 119 | Not in residue checker |
| 121 | fpam1L1(1), fpam2L1(1) |
| 123 | fpcm1L1(1), fpcm2L1(1) |
| 125 | aab1, aab2 |
| 127 | asbx1, asbx2 |
| 129 | amc1, amc2 |
| 131 | mad1, mad2 |
| 133 | msubx1, msubx2 |
| 135 | fptrfL2_in(0 to 160) |
| 137 | fpmd3sin_in |
| 139 | zm1h, zm2h |
| 145 | fpcpsign_in |
| 151 | addval, subval, mulval, madval, msubval |
| 161 | fpmmod3_out(0) |
| 162 | fpmmod3_out(3) |
| 163 | fpmmod3_out(1) |
| 164 | fpmmod3_out(4) |
| 165 | fpmmod3_out(2) |
| 167 | fpmmod3_out(0 to 4) |

TABLE B

FIG. 2 Signal Name Correspondence

| 125 | aab1, aab2 |
|---|---|
| 127 | asb1, asb2, asbn1, asbn2 |
| 129 | amc1, amc2 |
| 131 | mad1, mad2 |
| 133 | msub1, msub2, msubn1, msubn2 |
| 137 | fpmd3sin_in |
| 139 | zm1h, zm2h |
| 241 | mad1cmp, mad2cmp |
| 243 | aab1cmp, aab2cmp |
| 251 | addval |
| 253 | asb1cmp, asb2cmp |
| 255 | msub1cmp, msub2cmp |
| 257 | m1cmp, m2cmp |
| 316 | addchkf |
| 326 | madchkf |
| 336 | subchkf |
| 346 | msubchkf |
| 351 | subval |
| 356 | mulchkf |
| 451 | madval |
| 551 | msubval |
| 651 | mulval |

The following signals are low level signals not shown in the VHDL source code: 312, 314, 322, 324, 332, 334, 342, and 344. The following blocks are low level blocks and not shown in the VHDL source code: 236, 311, 313, 321, 323, 331, 333, 341 and 343. The following signal is a compliment, and not shown in the VHDL source code: not effective subtract 237 is a compliment of effective subtract 137.

Referring now to FIG. 1 in connection with Table 6, operand FB block 100 output line 101 is fed to shift right block 102, the output of which is fed on line 103 to complimenter 104. The output of complimenter 104 is fed on line 105 as one hundred and sixty one bits fpfbsht1_out(1 to 80), fpfbsht2_out(81 to 160) to modulus calculator for operand FB 106 and to carry save adder (CSA) tree 116. The output of modulus calculate for operand B block 106 is fed as a two bit residue value bm1h and bm2h on line 107 to add modulus result block 124, to subtract modulus result block 126, to multiply-add (MAD) modulus result block 130, and to multiply-subtract (MSUB) modulus result block 132.

Referring to FIG. 1 in connection with Table 3, the output of floating point operand FA block 110 is fed on line 109 as 53 bits fpfafraw_in(0 to 52) to carry save adder CSA tree 116 and modulus calculate block 120. As shown in Table 3, modulus calculate block calculates the mod3 residue of operand FA. The output of modulus calculate block 120 is latched and fed on two bit line 121 as residue signals fpam1L1(1) and fpam2L1(1) to add modulus result block 124, subtract modulus result block 126 and to multiply modulus result block 128. Modulus signal fpam1L1(1) is a one bit signal indicating, when on, that the result of the modulus 3 calculation on operand FA equals "1". Modulus signal fpam2L1(1) is a one bit signal indicating, when on, that the result of the modulus 3 calculation on operand FA equals "2". If both signals fpam1L1(1) and fpam2L1(1) equal zero, then the modulus 3 calculation on operand FA equals "0". Two similar output bits are used at the outputs of each of modulus 3 calculators 106, 120, 122 to signal the residue values of "0", "1" or "2" on two-bit lines 107 (bm1h, bm2h), 121 (fpam1L1(1), fpam2L1(1)), and 123 (fpcm1L1(1), fpcm2L1(1)), respectively.

Referring to FIG. 1 in connection with Table 4, the output of operand FC block 112 is fed as 53 bits fpfcfraw_in(0 to 52) on line 113 to decode block 114, and to modulus operand FC calculate block 122. The output of modulus calculate block 122 is latched and fed as two one-bit signals fpcm1L1(1) and fpcm2L1(1) on line 123 to multiply modulus result block 128.

Decode block 114, in this embodiment, is a Boothe decoder which for multiply operations provides a partial product decode which is sent via line 115 through carry save adder (CSA) tree 116, and is used to reduce n bits at a time. For add operations, the input to Boothe decoder 114 is gated straight through. Carry save adder tree 116, in this embodiment, provides a three to two partial adder, which outputs carry and sum bits on line 117 to partial product latch 118. The results are wrapped around on line 119 to be fed back through decode 114 into carry save adder tree 116 along with new operand bits from lines 109. The output of partial product block 118 is also fed on lines 119 to final adder 134, also referred to as Carry Propagate Adder (CPA) block 134, or full adder 134. Output 135 of full adder block (carry propagate adder CPA) 134 comprises one hundred sixty one bits zm1(0) to zm1(160) and is the result that is being checked by the residue checker of the invention. This result 135 is latched (for timing purposes) into modulus calculate (result) block 138, and the carry out bit is fed on line 145 as a carry out signal 145 to subtract modulus result block 126 and multiply subtract (MSUB) modulus result block 132.

The output of sign unit 136 is fed on line 137 as effective subtract signal 137 to Add select/compare block 142, to MAD select/compare block 140, to subtract (SUB) select/ compare block 152 and to multiply-subtract (MSUB) select/ compare block 154, and is there used to gate the appropriate select/compare block 142, 140, 152, 154 result to error detect block 150. Multiply compare 156 is not affected by effective subtract.

Effective subtract signal 137 is externally calculated as fpmd3sin__in from comparisons of input operand sign values and requested floating point mathematical function, wherein effective subtract is considered active for addition if operands are of different sign, for subtraction if operands are of same sign, for MAD if resultant product sign is different from add operand sign, and for MSUB if resultant product sign is equal to subtract operand sign.

Referring to FIG. 1 in connection with Table 5, the output of modulus calc (result) block 138 is fed as two one-bit signals zm1h and zm2h on two-bit line 139 to select/ compare multiply block 156, select/compare MSUB block 154, select/compare SUB block 152, select/compare MAD block 140 and select/compare ADD block 142.

Operand calculate result blocks are identified by grouping block 158 to include ADD result block 124, SUB result block 126, MULT result block 128, MAD result block 130 and MSUB result block 132.

Referring to FIG. 1 in connection with Table 7, the output of add modulus result block 124 is fed as two bit signals aab1 and aab2 on line 125 to add select/compare block 142 and subtract select/compare block 152. The output of subtract modulus result block 126 is fed as a four bit signal asb1, asb2, asbn1, asbn2 on line 127 to subtract (SUB) select/ compare block 152 and to add select/compare block 142. The output of multiply modulus result block 128 is fed as signals amc1 and amc2 on two bit line 129 to multiply subtract (MSUB) modulus result block 132, multiply add (MAD) modulus result block 130, and to MULT select/ compare block 156. The output of multiply add (MAD) modulus result block 130 is fed as two bit signal mad1 and mad2 on line 131 to select MAD select/compare block 140 and to multiply subtract select/compare block 154. The output of multiply subtract (MSUB) modulus result block 132 is fed as a four bit signal on line 133 (msub1, msub2, msubn1, and msubn2) as residue for msub1 result signal msub1, residue of msub2 result signal msub2, and as compliment signals msubn1 and msubn2, respectively, to select MSUB select/compare block 154 and to multiply add select compare block 140. Hereafter, in connection with FIG. 2, the structure and operation of one example embodiment of select/compare blocks 142, 140, 152, 154 and 156 will be further described.

Referring further to FIG. 1 in connection with Tables 3, 4 and 6, modulus calculators 106, 120 and 122 calculate the mod 3 residues of operands 100, 110 and 112. As shown in Tables 7, 8, 9, 10 and 11, modulus adders 124, 126, 128, 130 and 132 calculate, using the outputs of modulus calculators 106, 120 and 122, the modulus 3 results, or residues, of combinations of floating point operands 100, 110 and 112. Herein, each residue value at the output of adders/calculators 106, 120, 122, 124, 128 and 130, respectively, is a two bit value 107 (bm1h, bm2h), 121 (fpam1L1(1), fpam2L1(1)), 123 (fpcm1L1(1), fpcm2L1(1)), 125 (aab1, aab2), 129 (amc1, amc2), and 131 (mad1, mad2), representing "0", "1" or "2", which are the only three possible residue values in modulus 3 arithmetic. Herein, each residue value at the output of adders/calculators 126 and 132, respectively, is a four bit value 127 and 133, representing "0", "1" or "2" or mathmatical residue compliment function of residue "0", "1" or "2". Adders 106, 120, and 122, calculate their output values substantially in parallel from the values of the initial operands 100, 110, and 112.

Referring to FIG. 1 in connection with Tables 7, 8, 9, 10 and 11, in this embodiment, result select/compare blocks 142, 140, 152, 154 and 156 substantially concurrently compare the final modulus calculate result signals zm1h and zm2h on line 139 to each of the possible mathematical result generators 124, 126, 128, 130, and 132. In connection with Table 7, MULT compare results are shown as signals m1cmp and m2cmp, Table 8 ADD compare result are shown as signals aab1cmp and aab2cmp, Table 9 SUB compare result are shown as signals asb1cmp and asb2cmp, Table 10 MAD compare result are shown as signals mad1cmp and mad2cmp, and Table 11 MSUB compare result are shown as signals msub1cmp and msub2cmp.

Referring to FIG. 1 in connection with Tables 9 an 11, carry out signal 145 is used to select SUB modulus results asb1/asb2 or SUB compliment modulus results asbn1/asbn2, to generate two-bit subtract operand residue results asbx1/ asbx2, shown as line 127, for comparison to final modulus result 139. In a like fashion, now referring to FIG. 1 and Table 11, carry out signal 145 is used to select MSUB modulus results msub1/msub2 or MSUB compliment modulus results msubn1/msubn2, to generate two-bit MSUB operand residue results msubx1/msubx2, shown as line 133, for comparison to final modulus result 139.

As shown in Tables 7, 8, 9, 10, and 11, MULT error check signal 165 is generated as fpmmod3__out(2), or mulchk; ADD error check signal 161 is generated as fpmmod3__out (0), or addchk; SUB error check signal 163 is generated as fpmmod3__out(1), or subchk; MAD error check signal 162 is generated as fpmmod3__out(3), or madchk; and MSUB error check signal 164 is generated as fpmmod3__out(4), or msubchk.

Referring to FIG. 1 in connection with Table 12, valid OP generator block 160 provides a five bit signal addval, madval, subval, msubval and mulval on line 151. These five valid OP signals enable ADD select/compare block 142, MAD select/compare block 140, SUB select/compare block 152, MSUB select/compare block 154 and MULT select/ compare block 156, as will be more fully described hereafter in connection with FIG. 2, where these five valid operation signals 151 are shown as five lines 251, 351, 451, 551 and 651.

Referring to FIG. 1 in connection with Table 12, as will be more fully described hereafter in connection with FIG. 2, effective subtract signal fpmd3sin__in, shown as line 137, is used to select the correct modulus result calculator 158 by gating the applicable line 125, 127, 129, 131 or 133 into the corresponding select/compare block 140, 142, 152, 154 or 156:

for ADD generating the final ADD check result addchkf on line 161, for SUB generating the final SUB check result subchkf on line 163, for MAD generating the final MAD check result madchkf on line 162, for MSUB generating the final MSUB check result MSUBchkf on line 164.

Straight multiply modulus results on line 165 are not affected by effective subtract 137.

Referring to FIG. 1 in connection with Table 12, the output signals 161 (fpmmod3__out(0)), 162 (fpmmod3__out (3)), 163 (fpmmod3__out(1)), 164 (fpmmod3__out(4)) and 165 (fpmmod3__out(2))of select/compare add block 142, MAD block 140, SUB block 152, MSUB block 154 and MULT block 156, respectively, are fed to error detector block 150, the output of which appears on line 167 (fpmmod3_out(0 to 4)).

In operation, the effective subtract signal fpmd3sin_in 137 from sign unit 136 and the carry out signal fpcpasL2(1) 145 from final adder 134 are used to select the correct residue checker 124, 126, 128, 130 or 132 for comparison in compare units 142, 140, 152, 154 and 156 to detect and signal at error detect line 150, 167 an error in the result out of full adder 134. In this way, the result is provided without reference to the residue sign calculation required in the residue checkers of the prior art, and thus results in a saving of the logic circuits required.

Referring now to FIG. 2, further description will be provided with respect to the select/compare blocks 142, 140, 152, 154 and 156 of FIG. 1, illustrating one specific embodiment for utilizing effective subtract signal 137 for gating the appropriate modulus 3 compare results to the error detect line 150, 167.

In FIG. 2, add compare block 242, and gates 311 through 317, correspond to add select compare block 142. A similar correspondence exists with respect to multiply add compare block 240 and its associated gates down through 327, with multiply add select compare 140. And so on, for subtract compare 252 and subtract select/compare 152; and multiply subtract compare 254 and multiply subtract/compare 154.

As shown in FIG. 2, modulus calculate result block 138 output 139 (zm1h, zm2h) is fed to add compare 242, multiply add compare 240, subtract compare 252, multiply subtract compare 254 and multiply compare 256. Add modulus result 124 output line 125 (aab1, aab2) is fed to add compare 242; multiply add modulus result block 130 output 131 is fed to multiply add compare block 240; subtract modulus result block 126 output 127 (asbx1, asbx2) is fed to subtract compare 252, multiply subtract modulus result block 132 output 133, (msubx1, msubx2) is fed to multiply subtract compare 254; and multiply modulus result block 128 output 129 (amc1, amc2) is fed to multiply compare block 256. Each of compare blocks 242, 240, 252, 254 and 256 provide an active signal on their respective output lines 243, 241, 253, 255 and 257 if the modulus calculate result 139 compares equal to respective input modulus results 125, 131, 127, 133 and 129.

The output of add compare block 242 is fed on line 243 (aab1cmp, aab2cmp) to AND gates 311 and 331. The output of multiply add compare block 240 is fed on line 241 (mad1cmp, mad2cmp) to gates 321 and 341. The output of subtract compare block 252 is fed on line 253 to gates 313 and 333. The output of multiply compare block 254 is fed on line 255 (msub1cmp, msub2cmp) to gates 323 and 343. The output of multiply compare block 256 is fed on line 257 (m1cmp, m2cmp) to gate 357, where it is gated by multiply 651 to output line 165.

Sign unit 136 output 137 appears as effective subtract signal 137 at gates 313, 323, 331 and 341, and, after inversion in block 236, as not effective subtract signal 237 at gates 311, 321, 333 and 343. The output 312 and 314 of AND gates 311 and 313, respectively, are fed to OR gate 315; of AND gates 321 and 323 as signals 322 and 324, respectively, to OR gate 325; of and gates 331 and 333 as signals 332 and 334, respectively, to OR gate 335; and of AND gates 341 and 343 as signals 342 and 344, respectively, to or gate 345.

Valid operation generate block 160 provides operation signals 151, including add 251 (addval) to AND gate 317, subtract 351 (subval) to AND gate 337, multiply add 451 (madval) to AND gate 327, multiply subtract 551 (msubval) to AND gate 347, and multiply 651 (mulval) to AND gate 357 where they gate the outputs of OR gates 315, 325, 335, and 345 and multiply compare 256 on lines 316 (addchkf), 326 (madchkf), 336 (subchkf) and 346 (msubchkf), and 257 (mulchk) respectively, to output lines 161, 162, 163, 164 and 165, respectively.

In operation, by way of example for an add operation, line 251 is active, and depending upon whether or not effective subtract 137 or not effective subtract 237 is active, gates the output of add compare 242 or subtract compare 252 through to error signal output line 161. Thus, if for an add operation, with line 251 active, and for not effective subtract 237 active, if add compare 252 determines that modulus calculate result line 139 and add modulus result line 125 are equal, line 161 is not active, indicating that no error was detected in the operation of circuits performing the add operation. Similarly, for an add operation, with line 251 active, and for effective subtract 137 active, if add subtract compare 252 determines that subtract modulus result 126 output signal 127 compares equal to the modulus calculate result 138 output signal 139, then the result of subtract compare signal 253 (asb1cmp, asb2cmp) gates a no error signal from gates 313 and 315 through gate 317 to output line 161.

By way of further description of the operation of the invention, a computer implemented method is provided for checking the operation of circuitry, herein including blocks 114, 116, 118 and 134, used in calculating the final result on line 135 (signal fptrfL2_in(1 to 160)) of floating point arithmetic operations. Effective subtract signal 137 (fpmd3sin_in) is generated by sign unit 136, and responsive to that effective subtract signal 137, the modulus 3 residue of the selected mathmatical function or the modulus 3 residue of the add/subtract complimentary mathmatical function from modulus result blocks 124, 126, 130 and 132 are selected as final error determination of the operation of circuits providing the floating point arithmetic result at line 135.

In this preferred embodiment, effective subtract signal 137 is calculated as fpmd3sin_in from comparisons of input operand 100, 110 and 112 sign values and the floating point mathematical function being performed. Sign unit 136 operates to provide an effective subtract 137 signal which is active for addition if operands FB 100 and FA 110 are of different sign, for subtraction if operands FB 100 and FA 110 are of same sign, for multiply-add (MAD) if resultant product sign is different from the add operand FB sign, and for multiply-subtract (MSUB) if resultant product sign is equal to the subtract operand FB sign. A modulus 3 of final result full adder 134 shown on line 135 is generated by result modulus calculator 138 and appears on line 139 as two bit values zm1h and zm2h. This final result modulus is compared to each of the arithmetic modulus calculators 124, 126, 128, 130 and 132 for addition, subtraction, multiplication, multiply-add and multiply-subtract in blocks 142, 152, 156, 140 and 154 respectively. For addition, result modulus 139 is selected for comparison with addition modulus result calculator 124 when effective subtract 137 is inactive. Conversely for addition, result modulus 139 is selected for comparison with subtraction modulus caaalculator 126 when effective subtract 137 is active. Likewise for subtraction, result modulus 139 is compared to subtract modulus calculator 126 for effective subtract 137 active and to addition modulus calculator 124 for effective subtract 137 inactive.

When a floating point arithmetic operation is a multiply of operands FA 110 and FC 112, the mod 3 residues 121 and 123 of those operands are calculated in modulus calculate blocks 120 and 122, respectively, and combined in multiply modulus result block 128 to form operand multiply result modulus 129. The modulus of the final result product of operands FA 110 and FC 112 is calculated in modulus calculate result 138. Multiply select/compare block 156 determines if modulus result 139 and modulus of the product 129 are equal, and if not, generates an error signal 165 to error detect block 150.

Responsive to a floating point arithmetic operation adding operands FA 110 and FB 100, FB operand 100 is magnitude right shifted in block 102 for decimal alignment to operand FA 110. Complimenter block 104 calculates either the true or compliment of operand FB 100 for addition or subtraction functions as determined by the sign unit. Block 106 calculates the modulus 3 residue of operand FB 100 as signals bm1h and bm2h. Modulus calculate operand FA block 120 calculates the modulus 3 residue 121 of operand FA 110. Sign unit block 136 generates an effective subtract signal 137 inactive if the sign of operand FB100 and FA110 are equal for addition, and effective subtract signal 137 active if the sign of operand FB 100 and FA 110 are not equal for addition.

Responsive to a floating point arithmetic operation which is a subtract of operands FA 110 and FB 100, FB operand 100 on line 101 is magnitude right shifted in block 102 for decimal alignment to operand FA 110, and complimented in block 104 for effective subtract (that is, for use in the event of effective subtract). The modulus 3 residue of operand FB 100 is calculated in block 106, the modulus 3 residue of operand FA is calculated in block 120, and the residue addition and residue subtraction of residues FA and FB on lines 121 and 107 are calculated in add modulus result block 124 and subtract modulus result block 126, respectively. The modulus 3 result of the final result on line 135 is calculated in modulus calculate result block 138. For effective subtract line 137 inactive, the residue addition on line 125 is compared to the result residue on line 139; and for effective subtract active, the residue subtraction on line 127 is compared with the result residue on line 139. In this specific embodiment, these comparisons are always made, and the result gated by effective subtract 137 through to the error detect block 150, as previously described in connection with FIG. 2.

Responsive to a floating point arithmetic operation which is a multiplication of operands FA and FC and addition of operand FB, processing proceeds as follows. The modulus 3 residues of FA and FC operands are calculated in blocks 120 and 122 and combined in block 128 to form the operand multiply result modulus at line 129. The modulus 3 residue of the remaining FB operand 100 is calculated as above. The final operand residue is formed in block 130 from the operand multiply result modulus on line 129 and the modulus 3 residue of operand FB 100 on line 107. As above, the modulus 3 residue of the floating point result is calculated and placed on line 139. For effective subtract inactive, the modulus result on line 139 and the addition operand modulus on line 131 are compared; and for effective subtract active, the modulus result on line 133 is compared with modulus result on line 139. Based on the selected comparison (or on that comparison which is gated through by effective subtract signal 137), error detect block 150 is provided, for non-equivalence, an error signal on line 162 or 164.

Responsive to a floating point arithmetic operation which is a multiplication of operands FA and FC and subtraction of operand FB, the checking of the operation of circuits executing the operation is as follows: (1) the modulus 3 residues of FA and FC operands are calculated in blocks 120 and 122, respectively; (2) the modulus 3 residues on lines 121 and 123 are combined in block 128 to form an operand multiply result modulus at line 129; (3) the modulus 3 residue of the remaining FB operand is calculated in block 106; (4) in block 132, a final operand residue is formed from the product and FB residue values on lines 129 and 107, respectively; (5) in block 130, a final operand compliment residue is formed from the same product and FB residue values 107 and 129, respectively; (6) in block 138, the modulus 3 residue of the floating point result from full adder 134 is calculated; and (7) in block 154, for effective subtract inactive, the modulus result 139 and the final operand residue 133 are compared for equivalence; for effective subtact active, the modulus result 139 and final operand compliment residue 131 are compared for equivalence; and an error signal is generated on line 164 to error detect 150 in the event of non-equivalence.

Herein, the requested mathematical residue for an add function is the output of add modulus result 124, and the compliment requested mathematical residue is the output of subtract modulus result 126; and visa versa for a subtract function. For a multiply-add function, the requested mathematical residue is the output of MAD modulus result 130, and the compliment requested mathematical residue is the output of MSUB modulus result 132; and visa versa for a multiply-subtract function.

TABLE 1

```
INITIALIZATION
***************************************************************
-- *
-- *   TITLE:      FPU Mod3 Result Checker Logic
-- *   FILENAME:   fpmod3.vhd1
-- *
-- *   FUNCTION:   performs mod3 checking against
-- *               arithmetic logic
-- *
-- *
-- *
***************************************************************
@INCLUDE  FILE(fpu.pkg) ;
_____
?ENTITY  fpmod3e
         DECLARE  FUNC(fpmod3) CPN("fpmod3") SHEET(FQ000) ;
_***************************************************************
-- mod3 subunit interface
_***************************************************************
   -- Control inputs
   ?PORT  fpxaddop_in   IN  ; --SN("+ add operation ")
   ?PORT  fpxsubop_in   IN  ; --SN("+ sub operation ")
   ?PORT  fpxmulop_in   IN  ; --SN("+ multiply operation ")
   ?PORT  fpxmadop_in   IN  ; --SN("+ multiply operation ")
   ?PORT  fpm3vld_in    IN  ; --SN("+ FP valid instr in paw")
-- Sign unit (effop signal)
   ?PORT  fpmd3sin_in   IN  ; --SN("+ Effect op 0=sub  )
-- CPA unit
--        Cout=0, effsub, means CPA was a NEG results.
   ?PORT  fpcpsign_in   IN  ; --SN("+ CPA adder sign (carry)")
-- FBSHFT unit
   ?PORT  fpfbsamt_in(0)  IN  ; --SN("+ FB shift amount  ")
   ?PORT  fpfbstkt_in     IN  ; --SN("+ FB sticky bit   ")
   -- Data flow inputs
   ?PORT  fpfafraw_in(0 to 52) IN ;
                                 --SN("+ FA WR data in   ")
   ?PORT  fpfcfraw_in(0 to 52) IN ;
                                 --SN("+ FB WR data in   ")
   ?PORT  fpfbcomp_in      IN ;
                                 --SN("+ Compilment B   ")
   ?PORT  fpfbsht1_in(0 to 80)  IN ;
                                 --SN("+ Shifted/comped FB in1")
   ?PORT  fpfbsht2_in(81 to 160)  IN ;
                                 --SN("+ Shifted/comped FB in2")
```

TABLE 1-continued

```
-- * latch sign singals from adder and normalizer
-- * 0-active except for norm/round
-- * 1-active except for round or extended norms
    ?PORT fpxsload_in(0 to 1) IN; --SN("+ Load Work Sign Latch")
    ?PORT fptrfL2_in(0 TO 160) IN; --SN("+ CPA Sum-C (55:106) ")
    -- Data flow outputs
    --   0-ADD, 1-SUB, 2-MUL, 3-MADD, 4-MSUB
    ?PORT fpmmod3_out(0 to 4) OUT ; --SN("+ FP Mod3 Check Err ")
--***************************************************
-- clock/maintainence interface
--***************************************************
    ?PORT(*)   puAclk       IN    AC(-) CAPLIM(999) ;
                                  --SN("+ A Clock  ")
    ?PORT(*)   puL1clk      IN    SC(-) CAPLIM(999) ;
                                  --SN("+ L1 Clock  ")
    ?PORT(*)   puL2clk      IN    BC(-) CAPLIM(999) ;
                                  --SN("+ L2 Clock  ")
    -- local scan ports
    ?PORT    sdimod3_in    IN    SDI NET(*)    ;
    ?PORT    sdomod3_out   OUT   SDO NET(*)    ;
--  ?INCLUDE FILE(fpmod3.timechk) ;
    ATTRIBUTE ANALYSIS_NOT_REFERENCED OF fpxsload_in:
        SIGNAL IS "<0>TRUE" ;
?END ENTITY fpmod3e ;
---------------------------------------------------------------
?ARCHITECTURE  fpmod3a  OF  fpmod3e ;
    ?SRL  fpam1L1(1)     L2(fpam1L2(1))    FREERUN SCAN
          A(puAclk = '1')  B(puL2clk = '1') I(sdimod3_in)
        ; --SN2("+ mod 1 FA  Latched   ")
    ?SRL  fpam2L1(1)     L2(fpam2L2(1))    FREERUN SCAN
        ; --SN2("+ mod 2 FA  Latched   ")
    ?SRL  fpcm1L1(1)     L2(fpcm1L2(1))    FREERUN SCAN
        ; --SN2("+ mod 1 FC  Latched   ") ;
    ?SRL  fpcm2L1(1)     L2(fpcm2L2(1))    FREERUN SCAN
        ; --SN2("+ mod 2 FC  Latched   ") ;
    ?SRL  fpzm1L1(0 to 2)  L2(fpzm1L2(0 to 2)) FREERUN SCAN
        ; --SN2("+ mod 1s CPA 5th level ") ;
    ?SRL  fpzm2L1(0 to 2)  L2(fpzm2L2(0 to 2)) FREERUN SCAN
        ; --SN2("+ mod 2s CPA 5th level ") ;
    ?SRL  fpcpasL1(1)    L2(fpcpasL2(1))   FREERUN SCAN
        ; --SN2("+ CPA sign Cout  ") ;
    ?SRL  fpbm1L1(0 to 5)  L2(fpbm1L2(0 to 5)) FREERUN SCAN
        ; --SN2("+ mod 1s B 4th level ") ;
    ?SRL  fpbm2L1(0 to 5)  L2(fpbm2L2(0 to 5)) FREERUN SCAN
        ; --SN2("+ mod 2s B 5th level ") ;
```

TABLE 2

INITIALIZATION (CONTINUED)

```
    ?BEGIN ;
        sdomod3_out    <= fpbm2L2(5) ;
    ?BLOCK(**) CLOCK(puL1clk = '1') ;
        zero <= '0' ;
        ?MAP(style => direct) samt    <=    fpfbsamt_in(0)  ;
-- * Latch sets
        ?ATTRIBUTE BLOCK_DATA OF fpcpasL2: SIGNAL IS
"CLOCK_IMPLEMENTATION=/GATED_CLOC
        ?IF ( fpxsload_in(1) ) THEN; -- active except for norm/round
            fpcpasL1(1)    <= memoried fpcpsign_in  ;
        ?END IF;
```

TABLE 3

MODULUS 3 CACULATOR 120 FOR OPERAND FA 110
```
--    mod3 adder for - FA
--    1's
    am3a1(0 to 13) <= fpfafraw_in(0) &
        fpfafraw_in(4)  & fpfafraw_in(8)  & fpfafraw_in(12) &
        fpfafraw_in(16) & fpfafraw_in(20) & fpfafraw_in(24) &
        fpfafraw_in(28) & fpfafraw_in(32) & fpfafraw_in(36) &
        fpfafraw_in(40) & fpfafraw_in(44) & fpfafraw_in(48) &
        fpfafraw_in(52) ;
--    2's
    am3b1(0 to 13) <= zero &
        fpfafraw_in(3)  & fpfafraw_in(7)  & fpfafraw_in(11) &
        fpfafraw_in(15) & fpfafraw_in(19) & fpfafraw_in(23) &
        fpfafraw_in(27) & fpfafraw_in(31) & fpfafraw_in(35) &
        fpfafraw_in(39) & fpfafraw_in(43) & fpfafraw_in(47) &
        fpfafraw_in(51) ;
--    4's
    am3c1(0 to 13) <= zero &
        fpfafraw_in(2)  & fpfafraw_in(6)  & fpfafraw_in(10) &
        fpfafraw_in(14) & fpfafraw_in(18) & fpfafraw_in(22) &
        fpfafraw_in(26) & fpfafraw_in(30) & fpfafraw_in(34) &
        fpfafraw_in(38) & fpfafraw_in(42) & fpfafraw_in(46) &
        fpfafraw_in(50) ;
--    8's
    am3d1(0 to 13) <= zero &
        fpfafraw_in(1)  & fpfafraw_in(5)  & fpfafraw_in(9)  &
        fpfafraw_in(13) & fpfafraw_in(17) & fpfafraw_in(21) &
        fpfafraw_in(25) & fpfafraw_in(29) & fpfafraw_in(33) &
        fpfafraw_in(37) & fpfafraw_in(41) & fpfafraw_in(45) &
        fpfafraw_in(49) ;
--    1st generation of 1's mod result
    am1a(0 to 13) <=
    (am3a1 AND (NOT am3b1) AND (NOT am3c1) AND (NOT am3d1)) OR --1
    ((NOT am3a1) AND (NOT am3b1) AND am3c1 AND (NOT am3d1)) OR --4
    (am3a1 AND     am3b1 AND am3c1 AND (NOT am3d1)) OR --7
    ((NOT am3a1) AND (NOT am3b1) AND (NOT am3c1) AND     am3d1 ) OR --10
    (am3a1 AND (NOT am3b1) AND am3c1 AND am3d1     )  ; --13
--    1st generation of 2's mod result
    am2a(0 to 13) <=
    ((NOT am3a1) AND am3b1 AND (NOT am3c1) AND (NOT am3d1)) OR --2
    (am3a1 AND     (NOT am3b1) AND     am3c1 AND (NOT am3d1)) OR --5
```

TABLE 3-continued

```
((NOT am3a1) AND (NOT am3b1) AND (NOT am3c1) AND am3d1) OR --8
(am3a1 AND     am3b1 AND (NOT am3c1) AND am3d1) OR --11
((NOT am3a1) AND     am3b1 AND am3c1 AND     am3d1) ; --14
-   2nd generation reduction - FA
    am1a2(0 to 6)  <= am1a(0 to 6)  ;
    am1b2(7 to 13) <= am1a(7 to 13) ;
    am2c2(0 to 6)  <= am2a(0 to 6)  ;
    am2d2(7 to 13) <= am2a(7 to 13) ;
    am1c(0 to 6) <=
    (am1a2 AND (NOT am1b2) AND     (NOT am2d2) ) OR --1
    ((NOT am1a2) AND am1b2 AND (NOT am2c2)    ) OR --1
    (    am2c2 AND am2d2    )  ; --1
    am2c(0 to 6) <=
    (    (NOT am1b2) AND am2c2 AND (NOT am2d2) ) OR --2
    ((NOT am1a2) AND     (NOT am2c2) AND am2d2 ) OR --2
    (am1a2 AND     am1b2    )  ; --2
-   3nd generation reduction
    am1a3(0 to 3) <= am1c(0 to 3)    ;
    am1b3(4 to 7) <= am1c(4 to 6) & zero ;
    am2c3(0 to 3) <= am2c(0 to 3)    ;ffff
    am2d3(4 to 7) <= am2c(4 to 6) & zero ;
    am1d(0 to 3) <=
    (am1a3 AND (NOT am1b3) AND     (NOT am2d3) ) OR --1
    ((NOT am1a3) AND am1b3 AND (NOT am2c3)    ) OR --1
    (    am2c3 AND am2d3    )  ; --1
    am2d(0 to 3) <=
    (am1a3 AND     am1b3    ) OR --2
    (    (NOT am1b3) AND am2c3 AND (NOT am2d3) ) OR --2
    ((NOT am1a3) AND     (NOT am2c3) AND     am2d3 ) ; --2
-   4nd generation reduction
    am1a4(0 to 1) <= am1d(0 to 1)    ;
    am1b4(2 to 3) <= am1d(2 to 3)    ;
    am2c4(0 to 1) <= am2d(0 to 1)    ;
    am2d4(2 to 3) <= am2d(2 to 3)    ;
    am1e(0 to 1) <=
    (am1a4 AND (NOT am1b4) AND     (NOT am2d4) ) OR --1
    ((NOT am1a4) AND am1b4 AND (NOT am2c4)    ) OR  --1
    (    am2c4 AND am2d4    )  ; --1
    am2e(0 to 1) <=
    (am1a4 AND     am1b4    ) OR --2
    (    (NOT am1b4) AND am2c4 AND (NOT am2d4) ) OR --2
    ((NOT am1a4) AND     (NOT am2c4) AND     am2d4 ) ; --2
-   5nd generation reduction
    am1a5     <= am1e(0)    ;
    am1b5     <= am1e(1)    ;
    am2c5     <= am2e(0)    ;
    am2d5     <= am2e(1)    ;
    am1f <=
    (am1a5 AND (NOT am1b5) AND     (NOT am2d5) ) OR --1
    ((NOT am1a5) AND am1b5 AND (NOT am2c5)    ) OR --1
    (    am2c5 AND am2d5    )  ; --1
    am2f <=
    (am1a5 AND     am1b5    ) OR --2
    (    (NOT am1b5) AND am2c5 AND (NOT am2d5) ) OR --2
    ((NOT am1a5) AND     (NOT am2c5) AND     am2d5 ) ; --2
-   Latch up results - FA
        fpam1L1(1)     <= memoried am1f ;
        fpam2L1(1)     <= memoried am2f ;
```

TABLE 4

```
        MODULUS 3 CACULATOR 122 FOR OPERAND FC 112
-   mod3 adder for FC
-   1's
    cm3a1(0 to 13) <= fpfcfraw_in(0) &
        fpfcfraw_in(4)  & fpfcfraw_in(8)  & fpfcfraw_in(12) &
        fpfcfraw_in(16) & fpfcfraw_in(20) & fpfcfraw_in(24) &
        fpfcfraw_in(28) & fpfcfraw_in(32) & fpfcfraw_in(36) &
        fpfcfraw_in(40) & fpfcfraw_in(44) & fpfcfraw_in(48) &
        fpfcfraw_in(52) ;
-   2's
    cm3b1(0 to 13) <= zero &
        fpfcfraw_in(3)  & fpfcfraw_in(7)  & fpfcfraw_in(11) &
        fpfcfraw_in(15) & fpfcfraw_in(19) & fpfcfraw_in(23) &
        fpfcfraw_in(27) & fpfcfraw_in(31) & fpfcfraw_in(35) &
        fpfcfraw_in(39) & fpfcfraw_in(43) & fpfcfraw_in(47) &
```

TABLE 4-continued

```
        fpfcfraw_in(51) ;
-    4's
    cm3c1(0 to 13) <= zero &
        fpfcfraw_in(2)  & fpfcfraw_in(6)  & fpfcfraw_in(10) &
        fpfcfraw_in(14) & fpfcfraw_in(18) & fpfcfraw_in(22) &
        fpfcfraw_in(26) & fpfcfraw_in(30) & fpfcfraw_in(34) &
        fpfcfraw_in(38) & fpfcfraw_in(42) & fpfcfraw_in(46) &
        fpfcfraw_in(50) ;
-    8's
    cm3d1(0 to 13) <= zero &
        fpfcfraw_in(1)  & fpfcfraw_in(5)  & fpfcfraw_in(9)  &
        fpfcfraw_in(13) & fpfcfraw_in(17) & fpfcfraw_in(21) &
        fpfcfraw_in(25) & fpfcfraw_in(29) & fpfcfraw_in(33) &
        fpfcfraw_in(37) & fpfcfraw_in(41) & fpfcfraw_in(45) &
        fpfcfraw_in(49) ;
-    1st generation of 1's mod result
    cm1a(0 to 13) <=
    (cm3a1 AND (NOT cm3b1) AND (NOT cm3c1) AND (NOT cm3d1)) OR --1
    ((NOT cm3a1) AND (NOT cm3b1) AND cm3c1 AND (NOT cm3d1)) OR --4
    (cm3a1 AND cm3b1 AND cm3c1 AND (NOT cm3d1) )  OR --7
    ((NOT cm3a1) AND cm3b1 AND (NOT cm3c1) AND     cm3d1  )  OR --1
    (cm3a1 AND (NOT cm3b1) AND cm3c1 AND cm3d1 )       ; --1
-    1st generation of 2's mod result
    cm2a(0 to 13) <=
    ((NOT cm3a1) AND cm3b1 AND (NOT cm3c1) AND (NOT cm3d1)) OR --2
    (cm3a1 AND (NOT cm3b1) AND cm3c1 AND     (NOT cm3d1)) OR --5
    ((NOT cm3a1) AND (NOT cm3b1) AND (NOT cm3c1) AND cm3d1) OR --8
    (cm3a1 AND cm3b1 AND (NOT cm3c1) AND cm3d1 )   ; --1
    ((NOT cm3a1) AND cm3b1 AND cm3c1 AND cm3d1 )   ; --1
-    2nd generation reduction
    cm1a2(0 to 6)  <= cm1a(0 to 6)       ;
    cm1b2(7 to 13) <= cm1a(7 to 13)      ;
    cm2c2(0 to 6)  <= cm2a(0 to 6)       ;
    cm2d2(7 to 13) <= cm2a(7 to 13)      ;
    cm1c(0 to 6) <=
    (cm1a2 AND (NOT cm1b2) AND      (NOT cm2d2)  )  OR --1
    ((NOT cm1a2) AND cm1b2  AND (NOT cm2c2)       )  OR --1
    (       cm2c2  AND cm2d2  )  ; --1
    cm2c(0 to 6) <=
    (cm1a2 AND     cm1b2    ) OR --2
    (   (NOT cm1b2) AND cm2c2 AND (NOT cm2d2)  )  OR --2
    ((NOT cm1a2) AND    (NOT cm2c2) AND    cm2d2   ) ; --2
-    3nd generation reduction
    cm1a3(0 to 3) <= cm1c(0 to 3)       ;
    cm1b3(4 to 7) <= cm1c(4 to 6) & zero   ;
    cm2c3(0 to 3) <= cm2c(0 to 3)       ;
    cm2d3(4 to 7) <= cm2c(4 to 6) & zero   ;
    cm1d(0 to 3) <=
    (cm1a3  AND (NOT cm1b3) AND     (NOT cm2d3)  )  OR --1
    ((NOT cm1a3) AND cm1b3 AND (NOT cm2c3)       )  OR --1
    (    cm2c3 AND cm2d3   )   ; --1
    cm2d(0 to 3) <=
    (cm1a3  AND     cm1b3        ) OR --2
    (    (NOT cm1b3) AND cm2c3 AND (NOT cm2d3)  )  OR --2
    ((NOT cm1a3) AND     (NOT cm2c3) AND    cm2d3  )  ; --2
-    4nd generation reduction
    cm1a4(0 to 1) <= cm1d(0 to 1)       ;
    cm1b4(2 to 3) <= cm1d(2 to 3)       ;
    cm2c4(0 to 1) <= cm2d(0 to 1)       ;
    cm2d4(2 to 3) <= cm2d(2 to 3)       ;
    cm1e(0 to 1) <=
    (cm1a4 AND (NOT cm1b4) AND      (NOT cm2d4)  )  OR --1
    ((NOT cm1a4) AND cm1b4  AND (NOT cm2c4)       )  OR --1
    (    cm2c4  AND cm2d4   )   ; --1
    cm2e(0 to 1) <=
    (cm1a4  AND     cm1b4        ) OR --2
    (    (NOT cm1b4) AND cm2c4 AND (NOT cm2d4)  )  OR --2
    ((NOT cm1a4) AND     (NOT cm2c4) AND    cm2d4  )  ; --2
-    5nd generation reduction
    cm1a5       <= cm1e(0)    ;
    cm1b5       <= cm1e(1)    ;
    cm2c5       <= cm2e(0)    ;
    cm2d5       <= cm2e(1)    ;
    cm1f   <=
    (cm1a5 AND (NOT cm1b5) AND      (NOT cm2d5)  )  OR --1
    ((NOT cm1a5) AND cm1b5 AND (NOT cm2c5)       )  OR --1
    (    cm2c5  AND cm2d5   )  ; --1
    cm2f   <=
    (cm1a5  AND     cm1b5        ) OR --2
```

TABLE 4-continued

```
(     (NOT cm1b5) AND cm2c5 AND (NOT cm2d5)  ) OR --2
((NOT cm1a5) AND     (NOT cm2c5) AND      cm2d5  ) ; --2
--   Latch up results - FC
       fpcm1L1(1)        <= memoried cm1f     ;
       fpcm2L1(1)        <= memoried cm2f     ;
```

TABLE 5

MODULUS 3 ADDER 138 FOR CARRY PROPOGATE ADDER 134

```
--  ==========================
--  mod3 adder for CPA
--  ==========================
    zm1(0 to 160) <= fptrfL2_in(0 to 160) ;
--                              2   1   8   4   2   1
--  1's                        155 156 157 158 159 160
    zm1a1(0 to 40) <=
                                         zm1(0)     & zm1(4)     &
                  zm1(8)    & zm1(12)  & zm1(16)    & zm1(20)    &
                  zm1(24)   & zm1(28)  & zm1(32)    & zm1(36)    &
                  zm1(40)   & zm1(44)  & zm1(48)    & zm1(52)    &
                  zm1(56)   & zm1(60)  & zm1(64)    & zm1(68)    &
                  zm1(72)   & zm1(76)  & zm1(80)    & zm1(84)    &
                  zm1(88)   & zm1(92)  & zm1(96)    & zm1(100)   &
                  zm1(104)  & zm1(108) & zm1(112)   & zm1(116)   &
                  zm1(120)  & zm1(124) & zm1(128)   & zm1(132)   &
                  zm1(136)  & zm1(140) & zm1(144)   & zm1(148)   &
                  zm1(152)  & zm1(156) & zm1(160)                ;
--  2's
    zm1b1(0 to 40) <=
                                         zero       & zm1(3)     &
                  zm1(7)    & zm1(11)  & zm1(15)    & zm1(19)    &
                  zm1(23)   & zm1(27)  & zm1(31)    & zm1(35)    &
                  zm1(39)   & zm1(43)  & zm1(47)    & zm1(51)    &
                  zm1(55)   & zm1(59)  & zm1(63)    & zm1(67)    &
                  zm1(71)   & zm1(75)  & zm1(79)    & zm1(83)    &
                  zm1(87)   & zm1(91)  & zm1(95)    & zm1(99)    &
                  zm1(103)  & zm1(107) & zm1(111)   & zm1(115)   &
                  zm1(119)  & zm1(123) & zm1(127)   & zm1(131)   &
                  zm1(135)  & zm1(139) & zm1(143)   & zm1(147)   &
                  zm1(151)  & zm1(155) & zm1(159)
--  4's
    zm1c1(0 to 40) <=
                                         zero       & zm1(2)     &
                  zm1(6)    & zm1(10)  & zm1(14)    & zm1(18)    &
                  zm1(22)   & zm1(26)  & zm1(30)    & zm1(34)    &
                  zm1(38)   & zm1(42)  & zm1(46)    & zm1(50)    &
                  zm1(54)   & zm1(58)  & zm1(62)    & zm1(66)    &
                  zm1(70)   & zm1(74)  & zm1(78)    & zm1(82)    &
                  zm1(86)   & zm1(90)  & zm1(94)    & zm1(98)    &
                  zm1(102)  & zm1(106) & zm1(110)   & zm1(114)   &
                  zm1(118)  & zm1(122) & zm1(126)   & zm1(130)   &
                  zm1(134)  & zm1(138) & zm1(142)   & zm1(146)   &
                  zm1(150)  & zm1(154) & zm1(158)                ;
--  8's
    zm1d1(0 to 40) <=
                                         zero       & zm1(1)     &
                  zm1(5)    & zm1(9)   & zm1(13)    & zm1(17)    &
                  zm1(21)   & zm1(25)  & zm1(29)    & zm1(33)    &
                  zm1(37)   & zm1(41)  & zm1(45)    & zm1(49)    &
                  zm1(53)   & zm1(57)  & zm1(61)    & zm1(65)    &
                  zm1(69)   & zm1(73)  & zm1(77)    & zm1(81)    &
                  zm1(85)   & zm1(89)  & zm1(93)    & zm1(97)    &
                  zm1(101)  & zm1(105) & zm1(109)   & zm1(113)   &
                  zm1(117)  & zm1(121) & zm1(125)   & zm1(129)   &
                  zm1(133)  & zm1(137) & zm1(141)   & zm1(145)   &
                  zm1(149)  & zm1(153) & zm1(157)                ;
--  1st generation of 1's mod result       CPA
    zm1a(0 to 40) <=
        /  zm1a1 AND (NOT zm1b1) AND (NOT zm1c1) AND (NOT zm1d1)  \   OR --1
        |  (NOT zm1a1) AND (NOT zm1b1) AND zm1c1 AND (NOT zm1d1)  |   OR --4
        (  zm1a1 AND     zm1b1 AND      zm1c1 AND (NOT zm1d1)     )   OR --7
        |  (NOT zm1a1) AND     zm1b1 AND (NOT zm1c1) AND zm1d1    |   OR --10
        \  zm1a1 AND (NOT zm1b1) AND     zm1c1 AND     zm1d1      /   ; --13
--  1st generation of 2's mod result       CPA
    zm2a(0 to 40) <=
```

TABLE 5-continued

MODULUS 3 ADDER 138 FOR CARRY PROPOGATE ADDER 134

```
        ⎛ (NOT zm1a1) AND zm1b1 AND (NOT zm1c1) AND (NOT zm1d1)  ⎞   OR --2
        ⎜     zm1a1 AND (NOT zm1b1) AND zm1c1 AND (NOT zm1d1)    ⎟   OR --5
        ⎜ (NOT zm1a1) AND (NOT zm1b1) AND (NOT zm1c1) AND zm1d1) ⎟   OR --8
        ⎜     zm1a1 AND zm1b1 AND (NOT zm1c1) AND zm1d1          ⎟   OR --11
        ⎝ (NOT zm1a1) AND zm1b1 AND zm1c1 AND     zm1d1          ⎠   ; --14
-- 2nd generation reduction - CPA
        zm1a2(0 to 20)      <= zm1a(0 to 20)   ;
        zm1b2(21 to 41)     <= zm1a(21 to 40) & zero ;
        zm2c2(0 to 20)      <= zm2a(0 to 20)   ;
        zm2d2(21 to 41)     <= zm2a(21 to 40) & zero ;
        zm1c(0 to 20)       <=
        ⎛ zm1a2 AND (NOT zm1b2) AND       (NOT zm2d2)  ⎞   OR --1
        ⎜ (NOT zm1a2) AND zm1b2 AND (NOT zm2c2)        ⎟   OR --1
        ⎝                         zm2c2 AND zm2d2      ⎠   ; --1 zm2c(0 to 20) <=
        ⎛       (NOT zm1b2) AND zm2c2 AND (NOT zm2d2)  ⎞   OR --2
        ⎜ (NOT zm1a2) AND       (NOT zm2c2) AND  zm2d2 ⎟   OR --2
        ⎝ zm1a2 AND zm1b2                              ⎠   ; --2
-- 3nd generation reduction - CPA
        zm1a3(0 to 10)      <= zm1c(0 to 10)   ;
        zm1b3(11 to 21)     <= zm1c(11 to 20) & zero ;
        zm2c3(0 to 10)      <= zm2c(0 to 10)   ;
        zm2d3(11 to 21)     <= zm2c(11 to 20) & zero ;
        zm1d(0 to 10)       <=
        ⎛ zm1a3 AND (NOT zm1b3) AND       (NOT zm2d3)  ⎞   OR --1
        ⎜ (NOT zm1a3) AND zm1b3 AND (NOT zm2c3)        ⎟   OR --1
        ⎝                         zm2c3 AND zm2d3      ⎠   ; --1 zm2d(0 to 10) <=
        ⎛ zm1a3 AND      zm1b3                         ⎞   OR --2
        ⎜      (NOT zm1b3) AND zm2c3 AND (NOT zm2d3)   ⎟   OR --2
        ⎝ (NOT zm1a3) AND       (NOT zm2c3) AND  zm2d3 ⎠   ; --2
-- 4nd generation reduction - CPA
        zm1a4(0 to 5)       <= zm1d(0 to 5)    ;
        zm1b4(6 to 11)      <= zm1d(6 to 10) & zero ;
        zm2c4(0 to 5)       <= zm2d(0 to 5)    ;
        zm2d4(6 to 11)      <= zm2d(6 to 10) & zero ;
        zm1e(0 to 5)        <=
        ⎛ zm1a4 AND (NOT zm1b4) AND       (NOT zm2d4)  ⎞   OR --1
        ⎝ (NOT zm1a4) AND zm1b4 AND (NOT zm2c4)        ⎠   OR --1
                                  zm2c4 AND zm2d4          ; --1 zm2e(0 to 5) <=
        ⎛ zm1a4 AND      zm1b4                         ⎞   OR --2
        ⎜      (NOT zm1b4) AND zm2c4 AND (NOT zm2d4)   ⎟   OR --2
        ⎝ (NOT zm1a4) AND       (NOT zm2c4)            ⎠   ; --2
              AND       zm2d4
-- 5nd generation reduction - CPA
        zm1a5(0 to 2)       <= zm1e(0 to 2)    ;
        zm1b5(3 to 5)       <= zm1e(3 to 5)    ;
        zm2c5(0 to 2)       <= zm2e(0 to 2)    ;
        zm2d5(3 to 5)       <= zm2e(3 to 5)    ;
        zm1f(0 to 2)        <=
        ⎛ zm1a5 AND (NOT zm1b5) AND       (NOT zm2d5)  ⎞   OR --1
        ⎝ (NOT zm1a5) AND zm1b5 AND (NOT zm2c5)        ⎠   OR --1
                                  zm2c5 AND zm2d5          ; --1 zm2f(0 to 2) <=
        ⎛ zm1a5 AND      zm1b5                         ⎞   OR --1
        ⎜      (NOT zm1b5) AND zm2c5 AND (NOT zm2d5)   ⎟   OR --2
        ⎝ (NOT zm1a5) AND       (NOT zm2c5) AND  zm2d5 ⎠   ; --2
        ?ATTRIBUTE BLOCK_DATA OF fpzm1L2: SIGNAL IS
"CLOCK_IMPLEMENTATION=/GATED_CLOCK
        ?ATTRIBUTE BLOCK_DATA OF fpzm2L2: SIGNAL IS
"CLOCK_IMPLEMENTATION=/GATED_CLOCK
        ?IF ( fpxsload_in(1) ) THEN; -- active except for norm/round
                fpzm1L1(0 to 2)     <= memoried zm1f(0 to 2)   ;
                fpzm2L1(0 to 2)     <= memoried zm2f(0 to 2)   ;
        ?END IF;
-- 6nd generation reduction - CPA (From latches)
        zm1a6(0 to 1)       <= fpzm1L2(0 to 1)  ;
        zm1b6(1 to 2)       <= fpzm1L2(2) & zero  ;
        zm2c6(0 to 1)       <= fpzm2L2(0 to 1)  ;
        zm2d6(1 to 2)       <= fpzm2L2(2) & zero  ;
        zm1g(0 to 1)        <=
        ⎛ zm1a6 AND (NOT zm1b6) AND       (NOT zm2d6)  ⎞   OR --1
        ⎝ (NOT zm1a6) AND zm1b6 AND (NOT zm2c6)        ⎠   OR --1
                                  zm2c6 AND zm2d6          ; --1 zm2g(0 to 1) <=
        zm1a6 AND zm1b6                                    OR --2
```

TABLE 5-continued

MODULUS 3 ADDER 138 FOR CARRY PROPOGATE ADDER 134

```
(  (NOT zm1b6) AND zm2c6 AND (NOT zm2d6)              OR --2
(  (NOT zm1a6) AND (NOT zm2c6) AND       zm2d6        ; --2
-- 7th generation reduction - CPA
    zm1a7       <= zm1g(0)         ;
    zm1b7       <= zm1g(1)         ;
    zm2c7       <= zm2g(0)         ;
    zm2d7       <= zm2g(1)         ;
    zm1h        <=
(   zm1a7 AND (NOT zm1b7) AND            (NOT zm2d7)  OR --1
(   (NOT zm1a7) AND zm1b7 AND (NOT zm2c7)             OR --1
                           zm2c7 AND zm2d7            ; -- 1
    zm2h        <=
(   zm1a7 AND       zm1b7                          )  OR --2
(         (NOT zm1b7) AND zm2c7 AND (NOT zm2d7)    )  OR --2
(   (NOT zm1a7) AND        (NOT zm2c7) AND zm2d7   )  ; --2
```

TABLE 6

MODULUS 3 CALCULATOR 106 FOR OPERAND FB 100

```
--  ==========================================
--  mod 3 adder for FB data
--  ==========================================
--     force repowering of 'fpfbcomp' for xor gates (powerQ)
       ?MAP(STYLE => DIRECT, BHC =>D)
           powerQ1(0 to 2)   <= @REPEAT(3,fpfbcomp_in) ;
       ?MAP(STYLE => DIRECT, BHC =>D)
           powerQ2(0 to 23)  <=  powerQ1(0 to 2)    & powerQ1(0 to 2) &
                                 powerQ1(0 to 2)    & powerQ1(0 to 2) &
                                 powerQ1(0 to 2)    & powerQ1(0 to 2) &
                                 powerQ1(0 to 2)    & powerQ1(0 to 2) ;
           powerQ3(0 to 160) <=  powerQ2(0 to 23)   & powerQ2(0 to 23) &
                                 powerQ2(0 to 23)   & powerQ2(0 to 23) &
                                 powerQ2(0 to 23)   & powerQ2(0 to 23) &
                                 powerQ2(0 to 16)   ;
           bm1(0 to 160)     <=  ( fpfbsht1_in(0 to 80) &
                                   fpfbsht2_in(81 to 160) ) XOR
                                 powerQ3(0 to 160) ;
--                           2   1   8   4   2   1
-- 1's FB                    155 156 157 158 159 160
   bm1a1(0 to 40) <=
                                         bm1(0)      & bm1(4)     &
              bm1(8)    & bm1(12)     & bm1(16)     & bm1(20)    &
              bm1(24)   & bm1(28)     & bm1(32)     & bm1(36)    &
              bm1(40)   & bm1(44)     & bm1(48)     & bm1(52)    &
              bm1(56)   & bm1(60)     & bm1(64)     & bm1(68)    &
              bm1(72)   & bm1(76)     & bm1(80)     & bm1(84)    &
              bm1(88)   & bm1(92)     & bm1(96)     & bm1(100)   &
              bm1(104)  & bm1(108)    & bm1(112)    & bm1(116)   &
              bm1(120)  & bm1(124)    & bm1(128)    & bm1(132)   &
              bm1(136)  & bm1(140)    & bm1(144)    & bm1(148)   &
              bm1(152)  & bm1(156)    & bm1(160)                 ;
-- 2's
   bm1b1(0 to 40) <=
                                         zero        & bm1(3)     &
              bm1(7)    & bm1(11)     & bm1(15)     & bm1(19)    &
              bm1(23)   & bm1(27)     & bm1(31)     & bm1(35)    &
              bm1(39)   & bm1(43)     & bm1(47)     & bm1(51)    &
              bm1(55)   & bm1(59)     & bm1(63)     & bm1(67)    &
              bm1(71)   & bm1(75)     & bm1(79)     & bm1(83)    &
              bm1(87)   & bm1(91)     & bm1(95)     & bm1(99)    &
              bm1(103)  & bm1(107)    & bm1(111)    & bm1(115)   &
              bm1(119)  & bm1(123)    & bm1(127)    & bm1(131)   &
              bm1(135)  & bm1(139)    & bm1(143)    & bm1(147)   &
              bm1(151)  & bm1(155)    & bm1(159)                 ;
-- 4's
   bm1c1(0 to 40) <=
                                         zero        & bm1(2)     &
              bm1(6)    & bm1(10)     & bm1(14)     & bm1(18)    &
              bm1(22)   & bm1(26)     & bm1(30)     & bm1(34)    &
              bm1(38)   & bm1(42)     & bm1(46)     & bm1(50)    &
              bm1(54)   & bm1(58)     & bm1(62)     & bm1(66)    &
              bm1(70)   & bm1(74)     & bm1(78)     & bm1(82)    &
              bm1(86)   & bm1(90)     & bm1(94)     & bm1(98)    &
```

TABLE 6-continued

| MODULUS 3 CALCULATOR 106 FOR OPERAND FB 100 |
|---|

```
                    bm1(102)  & bm1(106)  & bm1(110)  & bm1(114)  &
                    bm1(118)  & bm1(122)  & bm1(126)  & bm1(130)  &
                    bm1(134)  & bm1(138)  & bm1(142)  & bm1(146)  &
                    bm1(150)  & bm1(154)  & bm1(158)              ;
-   8's
    bm1d1(0 to 40) <=
                                        zero       & bm1(1)     &
                    bm1(5)    & bm1(9)    & bm1(13)   & bm1(17)   &
                    bm1(21)   & bm1(25)   & bm1(29)   & bm1(33)   &
                    bm1(37)   & bm1(41)   & bm1(45)   & bm1(49)   &
                    bm1(53)   & bm1(57)   & bm1(61)   & bm1(65)   &
                    bm1(69)   & bm1(73)   & bm1(77)   & bm1(81)   &
                    bm1(85)   & bm1(89)   & bm1(93)   & bm1(97)   &
                    bm1(101)  & bm1(105)  & bm1(109)  & bm1(113)  &
                    bm1(117)  & bm1(121)  & bm1(125)  & bm1(129)  &
                    bm1(133)  & bm1(137)  & bm1(141)  & bm1(145)  &
                    bm1(149)  & bm1(153)  & bm1(157)              ;
-   1st generation of 1's mod result - FB
    bm1a(0 to 40) <=
      bm1a1 AND (NOT bm1b1) AND (NOT bm1c1) AND (NOT bm1d1)     OR --1
    ( (NOT bm1a1) AND (NOT bm1b1) AND bm1c1 AND (NOT bm1d1)     OR --4
      bm1a1 AND     bm1b1 AND     bm1c1 AND (NOT bm1d1)         OR --7
      (NOT bm1a1) AND bm1b1 AND (NOT bm1c1) AND     bm1d1       OR --10
      bm1a1 AND (NOT bm1b1) AND     bm1c1 AND     bm1d1         ; --13
-   1st generation of 2's mod result
    bm2a(0 to 40) <=
      (NOT bm1a1) AND bm1b1 AND (NOT bm1c1) AND (NOT bm1d1)     OR --2
    ( bm1a1 AND (NOT bm1b1) AND bm1c1 AND (NOT bm1d1)           OR --5
      (NOT bm1a1) AND (NOT bm1b1) AND (NOT bm1c1) AND bm1d1     OR --8
      bm1a1 AND     bm1b1 AND (NOT bm1c1) AND bm1d1             OR --11
      (NOT bm1a1) AND     bm1b1 AND     bm1c1 AND bm1d1)        ; --14
-   2nd generation reduction - FB
    bm1a2(0 to 20)      <= bm1a(0 to 20)  ;
    bm1b2(21 to 41)     <= bm1a(21 to 40) & zero  ;
    bm2c2(0 to 20)      <= bm2a(0 to 20)  ;
    bm2d2(21 to 41)     <= bm2a(21 to 40) & zero  ;
    bm1c(0 to 20)   <=
      bm1a2 AND (NOT bm1b2) AND             (NOT bm2d2)         OR --1
    ( (NOT bm1a2) AND bm1b2 AND (NOT bm2c2)                     OR --1
                              bm2c2 AND bm2d2                   ; --1
    bm2c(0 to 20) <=
      bm1a2 AND     bm1b2                                       OR --2
          (NOT bm1b2) AND bm2c2 AND (NOT bm2d2)                 OR --2
      (NOT bm1a2) AND       (NOT bm2c2) AND    bm2d2            ; --2
-   3nd generation reduction - FB
    bm1a3(0 to 10)      <= bm1c(0 to 10)  ;
    bm1b3(11 to 21)     <= bm1c(11 to 20) & zero  ;
    bm2c3(0 to 10)      <= bm2c(0 to 10)  ;
    bm2d3(11 to 21)     <= bm2c(11 to 20) & zero  ;
    bm1d(0 to 10)   <=
      bm1a3 AND (NOT bm1b3) AND             (NOT bm2d3)         OR --1
    ) (NOT bm1a3) AND bm1b3 AND (NOT bm2c3)                     OR --1
                              bm2c3 AND       bm2d3             ; --1
    bm2d(0 to 10) <=
      bm1a3 AND bm1b3                                           OR --2
    (       (NOT bm1b3) AND bm2c3 AND (NOT bm2d3)               OR --2
      (NOT bm1a3) AND       (NOT bm2c3) AND    bm2d3            ; --2
-   Bring in sticky just for eff subtracts to account
-   for the decrement seen at the output of the CPA adder.
-         *  cpa carry        0=sub         FB sticky bit
    substicky <= fpcpasL2(1) AND (NOT fpmd3sin_in) AND fpfbstkt_in;
-   4th generation reduction - FB
    bm1a4(0 to 5)       <= bm1d(0 to 5)   ;
    bm1b4(6 to 11)      <= bm1d(6 to 10) & substicky  ;
    bm2c4(0 to 5)       <= bm2d(0 to 5)   ;
    bm2d4(6 to 11)      <= bm2d(6 to 10) & zero  ;
    bm1e(0 to 5)    <=
      bm1a4 AND (NOT bm1b4) AND             (NOT bm2d4)         OR --1
    ) (NOT bm1a4) AND bm1b4 AND (NOT bm2c4)                     OR --1
                              bm2c4 AND bm2d4                   ; --1
    bm2e(0 to 5)    <=
      bm1a4 AND     bm1b4                                       OR --2
    (       (NOT bm1b4) AND bm2c4 AND (NOT bm2d4)               OR --2
      (NOT bm1a4) AND       (NOT bm2c4) AND    bm2d4)           ; --2
    fpbm1L1(0 to 5)     <= memoried bm1e(0 to 5)  ;
    fpbm2L1(0 to 5)     <= memoried bm2e(0 to 5)  ;
-   5nd generation reduction - FB
```

TABLE 6-continued

MODULUS 3 CALCULATOR 106 FOR OPERAND FB 100

```
    bm1a5(0 to 2)       <= fpbm112(0 to 2)  ;
    bm1b5(3 to 5)       <= fpbm112(3 to 5)  ;
    bm2c5(0 to 2)       <= fpbm212(0 to 2)  ;
    bm2d5(3 to 5)       <= fpbm212(3 to 5)  ;
    bm1f(0 to 2)        <=
  / bm1a5 AND (NOT bm1b5) AND         (NOT bm2d5)  \  OR --1
 (  (NOT bm1a5) AND bm1b5 AND (NOT bm2c5)           )  OR --1
  \                           bm2c5 AND bm2d5      /  ; --1
    bm2f(0 to 2) <=
  / bm1a5 AND         bm1b5                         \  OR --1
 (         (NOT bm1b5) AND bm2c5 AND (NOT bm2d5)    )  OR --2
  \ (NOT bm1a5) AND         (NOT bm2c5) AND bm2d5  /  ; --2
--  6nd generation reduction - FB (From latches)
    bm1a6(0 to 1)       <= bm1f(0 to 1)  ;
    bm1b6(2 to 3)       <= bm1f(2) & zero  ;
    bm2c6(0 to 1)       <= bm2f(0 to 1)  ;
    bm2d6(2 to 3)       <= bm2f(2) & zero  ;
    bm1g(0 to 1)        <=
  / bm1a6 AND (NOT bm1b6) AND         (NOT bm2d6)  \  OR --1
 (  (NOT bm1a6) AND bm1b6 AND (NOT bm2c6)           )  OR --1
  \                           bm2c6 AND bm2d6      /  ; --1
    bm2g(0 to 1) <=
  / bm1a6 AND         bm1b6                         \  OR --2
 (         (NOT bm1b6) AND bm2c6 AND (NOT bm2d6)    )  OR --2
  \ (NOT bm1a6) AND         (NOT bm2c6) AND bm2d6  /  ; --2
--  rcm
--  7th generation reduction - FB
    bm1a7               <= bm1g(0)  ;
    bm1b7               <= bm1g(1)  ;
    bm2c7               <= bm2g(0)  ;
    bm2d7               <= bm2g(1)  ;
    bm1h                <=
  / bm1a7 AND (NOT bm1b7) AND         (NOT bm2d7)  \  OR --1
 (  (NOT bm1a7) AND bm1b7 AND (NOT bm2c7)           )  OR --1
  \                           bm2c7 AND bm2d7      /  ; --1
    bm2h                <=
  / bm1a7 AND         bm1b7                         \  OR --2
 (         (NOT bm1b7) AND bm2c7 AND (NOT bm2d7)    )  OR --2
  \ (NOT bm1a7) AND         (NOT bm2c7) AND bm2d7  /  ; --2
```

TABLE 7

MULTIPLY COMPARE 128 156

```
--*************************************************************
--* Compare Results of mod3 adders and check for valid modes
--* Add, Subs, Multiplies, MADDs, MSUBS
--*************************************************************
--*fpam112(1) fpam212(1) bm1h bm2h fpcm112(1) fpcm112(1) zm1h
  zm2h
--* ADD-a, SUB-s, MUL-m, DIV-d, MADD-ma, MSUB-ms
--*************************************************************
--* Multiply compare
--*************************************************************
-- mod3 compare for multiply results
-- FA × FC (PRODUCTS) reduction
    amc1       <= ( fpam1L2(1) AND  fpcm1L2(1) ) OR
                  ( fpam2L2(1) AND  fpcm2L2(1) )   ;
    amc2       <=
                  ( fpam1L2(1) AND  fpcm2L2(1) ) OR
                  ( fpam2L2(1) AND  fpcm1L2(1) )   ;
    m1cmp      <= ( amc1    XOR    zm1h )  ;
    m2cmp      <= ( amc2    XOR    zm2h )  ;
    mulchk     <= ( m1cmp   OR     m2cmp )  ;
```

TABLE 8

ADD COMPARE 124 142

```
--*************************************************************
--* ADD
--*************************************************************
-- FA + FB (SUM)
```

TABLE 8-continued

```
    aab1      <= ( fpam1L2(1) AND    (bm1h NOR bm2h) ) OR
                 ( (fpam1L2(1) NOR fpam2L2(1)) AND bm1h ) OR
                 ( fpam2L2(1) AND    bm2h ) ;
    aab2      <= ( fpam1L2(1) AND    (bm1h NOR bm2h) ) OR
                 ( (fpam1L2(1) NOR fpam2L2(1)) AND bm2h ) OR
                 ( fpam112(1) AND    bm1h ) ;
    aab1cmp   <= ( aab1 XOR zm1h ) ;
    aab2cmp   <= ( aab2 XOR zm2h ) ;
    addchk    <= ( aab1cmp OR aab2cmp ) ;
```

TABLE 9

SUBTRACT COMPARE 126 152

```
--*************************************************************
--* SUB
--*************************************************************
-- FA - FB (SUB)
-- FA > FB
    asb1      <= ( fpam1L2(1) AND    (bm1h NOR bm2h) ) OR
                 ( (fpam112(1) NOR fpam2L2(1)) AND bm2h ) OR
                 ( fpam2L2(1) AND    bm1h ) ;
    asb2      <= ( fpam2L2(1) AND    (bm1h NOR bm2h) ) OR
                 ( (fpam1L2(1) NOR fpam2L2(1)) AND bm1h ) OR
                 ( fpam1L2(1) AND    bm2h ) ;
-- FA < FB
-- If the output of the CPA sub is negative, (change of sign),
-- then the mod3 compliment must be used, since the output of
-- the CPA is a magnitude (ie. 3-MOD3 of the CPA result)
-- This is calculated below.
```

TABLE 9-continued

```
-- fpcpasL2(1)=0 for change of sign.
   asbn1   <= (  fpam2L2(1) AND     (bm1h NOR bm2h)  )  OR
              ( (fpam1L2(1) NOR fpam2L2(1)) AND bm1h  )  OR
              (  fpam1L2(1)          AND bm2h  )  ;
   asbn2   <= (  fpam1L2(1) AND     (bm1h NOR bm2h)  )  OR
              ( (fpam1l2(1) NOR fpam2L2(1)) AND bm2h  )  OR
              (  fpam2L2(1) AND          bm1h  )  ;
-  Cout=0
   ?with fpcpasL2(1) select
   asbx1   <= asbn1    when('0')  ,
              asb1     when('1')  ;
   ?with fpcpasL2(1) select
   asbx2   <= asbn2    when('0')  ,
              asb2     when('1')  ;
   asb1cmp <= ( asbx1  XOR  zm1h )  ;
   asb2cmp <= ( asbx2  XOR  zm2h )  ;
   subchk  <= ( asb1cmp OR asb2cmp )  ;
```

TABLE 10

MULTIPLY ADD COMPARE 130 140

```
--***************************************************
--* MAD
--***************************************************
-  |(FA × FC)| > |FB|
-  FA × FC + FB
   mad1    <= (  amc1     AND     (bm1h NOR bm2h)  )  OR
              ( (amc1     NOR amc2)    AND bm1h    )  OR
              (  amc1     AND bm2h  )  ;
   mad2    <= (  amc2     AND     (bm1h NOR bm2h)  )  OR
              ( (amc1     NOR amc2)    AND bm2h    )  OR
              (  amc1     AND bm1h  )  ;
   mad1cmp <= ( mad1 XOR zm1h )  ;
   mad2cmp <= ( mad2 XOR zm2h )  ;
   madchk  <= ( mad1cmp OR mad2cmp )  ;
```

TABLE 11

MULTIPLY SUBTRACT COMPARE 132 154

```
--***************************************************
--* MSUB
--***************************************************
-  |FA × FC| - |FB|
-  |FA × FC| > |FB|
   msub1   <= (  amc1     AND     (bm1h NOR bm2h)  )  OR
              ( (amc1     NOR amc2)    AND bm2h    )  OR
              (  amc2     AND bm1h  )  ;
   msub2   <= (  amc2     AND     (bm1h NOR bm2h)  )  OR
              ( (amc1     NOR amc2)    AND bm1h    )  OR
              (  amc1     AND bm2h  )  ;
-  FA × FC > FB
-  FA × FC - FB
-  If the output of the CPA sub is negative, (change of sign),
-  then the mod3 compliment must be used, since the output of
-  the CPA is a magnitude (ie. 3-MOD3 of the CPA result)
-  This is calculated below.
-- fpcpasL2(1)=0 for change of sign.
   msubn1  <= (  amc2     AND     (bm1h NOR bm2h)  )  OR
              ( (amc1     NOR amc2)    AND bm1h    )  OR
              (  amc1     AND bm2h  )  ;
   msubn2  <= (  amc1     AND     (bm1h NOR bm2h)  )  OR
              ( (amc1     NOR amc2)    AND bm2h    )  OR
              (  amc2     AND bm1h  )  ;
   ?with fpcpasL2(1) select
   msubx1  <= msubn1   when('0')  ,
              msub1    when('1')  ;
   ?with fpcpasL2(1) select
   msubx2  <= msubn2   when('0')  ,
              msub2    when('1')  ;
   msub1cmp <= ( msubx1  XOR  zm1h )  ;
   msub2cmp <= ( msubx2  XOR  zm2h )  ;
   msubchk  <= ( msub1cmp OR msub2cmp )  ;
```

TABLE 12

FUNCTION MODE SELECTS 140, 142, 152, 154, 156, 150

```
--***************************************************
--* Function mode selects
--***************************************************
-- valid op selects
-- samt is the most significant bit of the FB shift amount.
-- If on=1, this indicates no shift, (ie FB >> FA or FA × FC).
-- Under this condition, we do not check the output of the CPA.
-- (Because in our data flow, we still have either FA or
-- FA × FB flowing through the CPA). This will screw up the
-- CPA mod3 calculation. In order to check the CPA under this
-- condition, the 160 CPA bits out must be broken up into 56
-- and 104, gating off the last 104 bits. In this case we would
-- only be putting in FB and checking that FB FB came out
-- undisturbed! Why do it?
-- Below we gate off the checking in this case.
--*         load ft                     math path
--*         -------                     ---------
   addval  <= fpm3vld_in                               AND
              fpxaddop_in    AND (NOT fpxmadop_in)   ;
   subval  <= fpm3vld_in                               AND
              fpxsubop_in    AND (NOT fpxmadop_in)   ;
   mulval  <= fpm3vld_in                               AND
              fpxmulop_in                              ;
   madval  <= fpm3vld_in                               AND
              fpxaddop_in    AND   fpxmadop_in        ;
   msubval <= fpm3vld_in                               AND
              fpxsubop_in    AND   fpxmadop_in        ;
--* ADD/SUB and MAD/MSUB calculations are reversed
--* if effop=sub and CPA result
--* is neg as shown by Cout=0. (effop=0 AND Cout=0)
--* fpmd3sin_in=0 ===> effop=subtract
--* fpmd3sin_in=1 ===> effop=add
   ?with (fpmd3sin_in)                        select
   addchkf <= addchk                     when('1')  ,
              subchk AND (NOT samt)      when('0')  ;
   ?with (fpmd3sin_in)                        select
   subchkf <= addchk                     when('1')  ,
              subchk AND (NOT samt)      when('0')  ;
   ?with (fpmd3sin_in)                        select
   madchkf <= madchk                     when('1')  ,
              msubchk AND (NOT samt)     when('0')  ;
   ?with (fpmd3sin_in)                        select
   msubchkf <= madchk                    when('1')  ,
              msubchk AND (NOT samt)     when('0')  ;
--*         addchk  subchk  mulchk  madchk msubchk
   fpmmod3_out(0 TO 4)  <= (addchkf  AND  addval  )  &
                           (subchkf  AND  subval  )  &
                           (mulchk   AND  mulval  )  &
                           (madchkf  AND  madval  )  &
                           (msubchkf AND  msubval )  ;
?END BLOCK    ;
?END  ARCHITECTURE fpmod3a ;
```

EXAMPLES

Example 1

Add 11+4
    Add line 251 is active
    Effective subtract line 137 is inactive

| | | |
|---|---|---|
| FA 110 | 4 | |
| FB 100 | 11 | |
| Full adder 134,135 | 15 | |
| Mod Calc Res 138,139 | 0 | residue, or remainder, of 15/3 = 5 rem 0. |
| Mod Calc Op FB 106,107 | 2 | residue of FB 100 = 11/3 = 3 rem 2 |
| Mod Calc Op FA 120,121 | 1 | residue of of FA 110 = 4/3 = 1 rem 1 |
| Add Mod Result 124,125 | 0 | residue of addition of residue lines 107 and 121 = 2+1 = 3 (3/3 = 1 rem 0) |
| Add select/comp 142 | ok | as lines 125 and 139 both equal |

-continued

| | | |
|---|---|---|
| | | 0, there is no error, and block 142 output line 161 is inactive. |

In Example 1, had there been an error in the calculation result out of full adder 134, it is likely that the residue of that calculation derived by modulus calculate result 138 and placed on line 139 would not have been equal to the residue on line 125; in which event, add select/compare 142 would have detected the inequality and signalled an error on line 161.

Example 2

Add 11+(−4)
 Add line 251 is active
 Effective subtract line 137 is active

| | | |
|---|---|---|
| FA 110 | −4 | |
| FB 100 | 11 | |
| Full adder 134,135 | 7 | |
| Mod Calc Res 138,139 | 1 | residue, or remainder, of 7/3 = 2 rem 1 |
| Mod Calc Op FB 106,107 | 2 | residue of FB 100 = 11/3 = 3 rem 2 |
| Mod Calc Op FA 120,121 | 1 | residue of of FA 110 = |−4|/3 = 1 rem 1 * |
| Add Mod Result 124,125 | 0 | residue of addition of residue lines 107 and 121 = 2+1 = 3 (3/3 = 1 rem 0) |
| Sub Mod Result 126,127 | 1 | residue of 2−1 = 1 rem 1 (block 126 subtracts line 121 from line 107) |
| Add select/comp 142 | ok | as lines 127 and 139 both equal 1, there is no error, and block 142 output line 161 is inactive. Line 127 is selected for this compare in block 142 by effective subtract line 137 being active. |

In Example 2, at the Mod Calc Op FA 120,121 step, note that number magnitudes only (that is, absolute values, such as |−4|) are used in calculations, requiring no logic for sign propagation.

Example 3

Calculate 11+(4*2)
 Multiply add line 451 is active
 Effective subtract line 137 is inactive (line 237 active)

| | | |
|---|---|---|
| FA 110 | 4 | |
| FB 100 | 11 | |
| FC 112 | 2 | |
| Full adder 134,135 | 19 | (4 * 2) + 11 = 19 |
| Mod Calc Res 138,139 | 1 | residue, or remainder, of 19/3 = 6 rem 1. |
| Mod Calc Op FB 106,107 | 2 | residue of FB 100 = 11/3 = 3 rem 2 |
| Mod Calc Op FA 120,121 | 1 | residue of of FA 110 = 4/3 = 1 rem 1 |
| Mod Calc Op FC 122,123 | 2 | residue of 2/3 = 0 rem 2 |
| Mult Mod Result 128,129 | 2 | residue of product of lines 121 and 123: product = 1 * 2 = 2; 2 mod 3 = remainder of 2/3 = 0 rem 2. |
| MAD Mod Result 130,131 | 1 | residue of addition of lines 129 and 121: 2 + 2 = 4, 4 mod 3 = remainder of 4/3 = 1 rem 1. |
| MAD select/comp 140 | ok | as lines 139 and 131 both equal 1, there is no error, and block |

-continued

| | |
|---|---|
| | 140 output line 162 is inactive. |

Line 131 is selected for this compare in block 140 by effective subtract line 137 being inactive, as has been previously described in connection with FIG. 2.

Advantages Over the Prior Art

By this invention, there is provided an apparatus and method performing modulus 3 residue checking of floating point arithmetic operations which eliminate the need to maintain the sign value of individual operand residues as well as the sign of the resultant residue. This results in a savings in logic circuits or programming steps with resultant lower cost and faster response than possible with prior art devices.

Alternative Embodiments

It will be appreciated that, although a specific embodiment of the invention has been described herein for purposes of illustration, various modifications may be made without departing from the spirit and scope of the invention. In particular, use of the effective subtract signal may also be used to select complimented modulus calculations rather than complimented arithmetic function.

The application of the effective subtract for true and compliment modulus selection for final result modulus comparison, additionally applies to all other value based modulus calculations.

Accordingly, the scope of protection of this invention is limited only by the following claims and their equivalents.

I claim:

1. A computer implemented method for checking the operation of circuitry in calculating the final result of floating point arithmetic operations, including the steps of:
 operating said circuitry to provide a modulus residue;
 operating said circuitry to provide a modulus compliment residue;
 receiving an effective subtract signal;
 responsive to said effective subtract signal, selecting either said modulus residue or said modulus compliment residue; and
 using the selected residue to check said circuitry.

2. The method of claim 1 wherein said effective subtract signal is derived from comparisons of input operand sign values and a requested floating point mathematical function, and wherein said effective subtract signal is considered active for addition if operands are of different sign, for subtraction if operands are of same sign, for multiply-add if resultant product sign is different from add operand sign, and for multiply-subtract if resultant product sign is equal to subtract operand sign.

3. The method of claim 2 wherein said requested modulus residue is selected when said effective subtract signal is inactive and said modulus compliment residue is selected when said effective subtract signal is active for operations of addition, subtraction, multiply-addition and multiply-subtraction.

4. The method of claim 1 wherein said floating point arithmetic operation is a multiply of operands FA and FC, comprising the further steps of:
 calculating the mod 3 residues of said operands,
 combining said mod 3 residues to form an operand multiply result modulus, calculating the modulus of the product of said operands, and determining if the modulus result and the modulus of the product are equal, and if not generating an error signal.

5. The method of claim 1 wherein said floating point arithmetic operation is an add of operands FA and FB, comprising the further steps of:

magnitude right shifting said operand FB for decimal alignment to said operand FA;

complimenting said operand FB for effective subtract;

calculating the modulus 3 residue of said operand FB;

calculating the modulus 3 residue of said operand FA;

calculating the modulus 3 addition residue of said operand FA and said operand FB;

calculating the modulus 3 subtraction residue of said operand FA and said operand FB;

calculating the modulus 3 result residue from said final result;

determining if said addition residue and said result residue are equal for effective subtract inactive; and determining if said subtraction residue and said result residue are equal for effective subtract active.

6. The method of claim 1 wherein said floating point arithmetic operation is a subtract of operands FA and FB, comprising the further steps of:

magnitude right shifting said operand FB for decimal alignment to said operand FA;

complimenting said operand FB for effective subtract;

calculating the modulus 3 residue of said operand FB;

calculating the modulus 3 residue of said operand FA;

calculating the modulus 3 addition residue of said operand FA and said operand FB;

calculating the modulus 3 subtraction residue of said operand FA and said operand FB;

calculating the modulus 3 residue of said final result;

determining if said addition residue and said result residue are equal for effective subtract inactive; and determining if said subtraction residue and said result residue are equal for effective subtract active.

7. The method of claim 1 wherein said floating point arithmetic operation is a multiplication of operands FA and FC and addition of operand FB comprising the further steps of:

calculating the modulus 3 residues of said operands FA and FC and combining said residues of operands FA and FC to form an operand multiply result modulus;

calculating the modulus of the product of said operands FA and FC;

calculating the modulus 3 residue of the said operand FB;

forming a final operand residue from said modulus of the product and said residue of said operand FB;

calculating the modulus 3 residue of said final result; and determining if the residue of said final result and said final operand residue are equal and, if not, generating an error signal.

8. The method of claim 1 wherein said floating point arithmetic operation is an multiplication of operands FA and FC and subtraction of operand FB, comprising the further steps of:

calculating the modulus 3 residues of said operands FA and FC;

combining said modulus 3 residues to form an operand multiply result modulus.

calculating the modulus of the product of said operands, calculating the modulus 3 residue of said operand FB;

forming a final operand residue from said product and operand FB residue values;

forming a final operand compliment residue from said product and operand FB residue values;

calculating the modulus 3 residue of said final result;

determining if the modulus residue of said final result and the final operand residue are equal for effective subtract inactive, determining if the modulus residue of said final result and the final operand compliment residue are equal for effective subtract active, and if neither, generating an error signal.

9. Apparatus for checking the operation of floating point arithmetic unit circuitry, comprising:

means for providing a modulus residue;

means for providing a modulus compliment residue;

means for receiving an effective subtract signal;

means responsive to said effective subtract signal for selecting either said modulus residue or said modulus compliment residue; and means using the selected residue to check said circuitry.

10. Apparatus for checking the operation of floating point arithmetic unit circuitry, the arithmetic unit circuitry including as input operands a first operand, a second operand, and a third operand, and means responsive to said input operands for calculating a final result, the final result including a final value and a sign value, comprising:

residue means for calculating a residue value for each of said operands;

floating point residue calculations means for each floating point calculation of add, subtract, multiply, multiply-add and multiply-subtract;

error detecting means responsive to said residue values, a carryout signal from said final value, and said sign value for providing a signal selectively representative of an error in said circuitry.

11. The apparatus of claim 10 wherein said error detecting means further comprises:

add mod result means responsive to FA operand residue and FB operand residue for generating a first signal representative of addition;

subtract mod result means responsive to FA operand residue and FB operand residue for generating a second signal representative of subtraction;

multiply mod result means responsive to FA operand residue and FC operand residue for generating a third signal representative of multiplication;

multiply add mod result means responsive to multiply mod result means and FB operand residue for generating a fourth signal representative of multiply add;

multiply subtract mod result means responsive to multiply mod result means 128 and FB operand residue for generating a fifth signal representative of multiply subtract;

valid operation generator means responsive to floating point function for generating a sixth signal representative of floating point function active;

select and compare means responsive to said effective subtract signal for selecting between add operations, subtract operations, multiply operations, multiply add operations and multiply subtract operations for generating an error detect signal.

* * * * *